(12) United States Patent
Narang et al.

(10) Patent No.: US 11,586,214 B2
(45) Date of Patent: Feb. 21, 2023

(54) METHOD AND SYSTEM FOR DETERMINISTIC TRAJECTORY SELECTION BASED ON UNCERTAINTY ESTIMATION FOR AN AUTONOMOUS AGENT

(71) Applicant: Gatik AI Inc., Palo Alto, CA (US)

(72) Inventors: Gautam Narang, Palo Alto, CA (US); Apeksha Kumavat, Palo Alto, CA (US); Arjun Narang, Palo Alto, CA (US); Kinh Tieu, Palo Alto, CA (US); Michael Smart, Palo Alto, CA (US); Marko Ilievski, Palo Alto, CA (US)

(73) Assignee: Gatik AI Inc., Palo Alto, CA (US)

( * ) Notice: Subject to any disclaimer, the term of this patent is extended or adjusted under 35 U.S.C. 154(b) by 0 days.

(21) Appl. No.: 17/704,301

(22) Filed: Mar. 25, 2022

(65) Prior Publication Data

US 2022/0214693 A1 Jul. 7, 2022

Related U.S. Application Data

(63) Continuation of application No. 17/685,905, filed on Mar. 3, 2022, which is a continuation of application No. 17/496,053, filed on Oct. 7, 2021, now Pat. No. 11,320,827, which is a continuation of application No. 17/483,539, filed on Sep. 23, 2021, now Pat. No.
(Continued)

(51) Int. Cl.
*G05D 1/02* (2020.01)
*G05D 1/00* (2006.01)
*G06K 9/62* (2022.01)
*G06N 20/00* (2019.01)

(52) U.S. Cl.
CPC ......... *G05D 1/0221* (2013.01); *G05D 1/0088* (2013.01); *G05D 1/0214* (2013.01); *G06K 9/6259* (2013.01); *G06K 9/6262* (2013.01); *G06N 20/00* (2019.01)

(58) Field of Classification Search
CPC .. G05D 1/0221; G05D 1/0088; G05D 1/0214; G06N 20/00; G06K 9/6259; G06K 9/6262
See application file for complete search history.

(56) References Cited

U.S. PATENT DOCUMENTS 6,278,965 B1 8/2001 Glass et al.
6,292,830 B1 9/2001 Taylor et al.
(Continued)

OTHER PUBLICATIONS

"ApolloAuto/apollo Planning", GitHub, https://github.com/ApolloAuto/apollo/blob/master/modules/planning/README.md.
(Continued)

*Primary Examiner* — Michael D Lang
(74) *Attorney, Agent, or Firm* — Jeffrey Schox; Caitlin Ploch

(57) ABSTRACT

A system for deterministic trajectory selection based on uncertainty estimation includes a set of one or more computing systems. A method for deterministic trajectory selection includes receiving a set of inputs; determining a set of outputs; determining uncertainty parameters associated with any or all of the set of inputs and/or any or all of the set of outputs; and evaluating the uncertainty parameters and optionally triggering a process and/or action in response.

19 Claims, 15 Drawing Sheets

Related U.S. Application Data 11,307,594, which is a continuation of application No. 17/127,599, filed on Dec. 18, 2020, now Pat. No. 11,157,010.

(60) Provisional application No. 63/055,794, filed on Jul. 23, 2020, provisional application No. 63/035,401, filed on Jun. 5, 2020.

(56) References Cited

U.S. PATENT DOCUMENTS

| | | | |
|---|---|---|---|
| 8,024,112 | B2 | 9/2011 | Krumm et al. |
| 8,737,986 | B2 | 5/2014 | Rhoads et al. |
| 9,507,346 | B1 | 11/2016 | Levinson et al. |
| 10,106,153 | B1 | 10/2018 | Xiao et al. |
| 10,860,022 | B2 | 12/2020 | Korchev et al. |
| 11,282,013 | B2 | 3/2022 | Rana et al. |
| 2008/0312833 | A1 | 12/2008 | Greene et al. |
| 2009/0306866 | A1 | 12/2009 | Malikopoulos |
| 2010/0131148 | A1 | 5/2010 | Camhi et al. |
| 2015/0100530 | A1 | 4/2015 | Mnih et al. |
| 2017/0345181 | A1 | 11/2017 | Yu et al. |
| 2018/0196439 | A1 | 7/2018 | Levinson et al. |
| 2018/0232585 | A1 | 8/2018 | Kim |
| 2018/0339709 | A1 | 11/2018 | Tiwari et al. |
| 2019/0033085 | A1 | 1/2019 | Ogale et al. |
| 2019/0084571 | A1 | 3/2019 | Zhu et al. |
| 2019/0145784 | A1 | 5/2019 | Ma et al. |
| 2019/0146492 | A1 | 5/2019 | Phillips et al. |
| 2019/0146508 | A1 | 5/2019 | Dean et al. |
| 2019/0147255 | A1 | 5/2019 | Homayounfar et al. |
| 2019/0315351 | A1 | 10/2019 | Smith et al. |
| 2019/0317496 | A1 | 10/2019 | Korchev et al. |
| 2019/0329763 | A1 | 10/2019 | Sierra Gonzalez et al. |
| 2019/0378019 | A1 | 12/2019 | Scheutz et al. |
| 2020/0033855 | A1 | 1/2020 | Jammalamadaka et al. |
| 2020/0033868 | A1 | 1/2020 | Palanisamy et al. |
| 2020/0086862 | A1 | 3/2020 | Cui et al. |
| 2020/0150672 | A1 | 5/2020 | Naghshvar et al. |
| 2020/0174472 | A1 | 6/2020 | Zhang et al. |
| 2020/0207339 | A1 | 7/2020 | Neil et al. |
| 2020/0302322 | A1 | 9/2020 | Tukiainen et al. |
| 2020/0356828 | A1 | 11/2020 | Palanisamy et al. |
| 2021/0117760 | A1* | 4/2021 | Krishnan ............ G06N 3/0472 |
| 2021/0201112 | A1 | 7/2021 | Gauthier et al. |
| 2021/0304123 | A1 | 9/2021 | Vanapalli et al. |

OTHER PUBLICATIONS

"Learning to Drive in a Day", https://www.youtube.com/watch?v=eRwTbRtnT1l, Jul. 2, 2018.

"Learning to Drive in a Day", Wayve, in research, Jun. 28, 2018, https://wayve.ai/blog/learning-to-drive-in-a-day-with-reinforcement-learning/.

Dabboussi, Abdallah, "Dependability approaches for mobile environment: Application on connected autonomous vehicles", Diss. University Bourgogne Franche-Comtè, 2019, submitted Mar. 12, 2020.

Kendall, Alex, et al., "Learning to Drive in a Day", arXiv:1807.00412v2, Sep. 11, 2011.

Loquercio, Antonio, et al., "A General Framework for Uncertainty Estimation in Deep Learning", IEEE Robotics and Automation Letters PP(99):1-1, Feb. 2020.

Rastgoftar, Hossein, et al., "A Data-Driven Approach for Autonomous Motion Planning and Control in Off-Road Driving Scenarios", 2018 American Control Conference (ACC), IEEE, 2018, May 2018.

Schwarting, Wilko, et al., "Planning and Decision-Making for Autonomous Vehicles", Annual Review of Control, Robotics, and Autonomous Systems, Jan. 12, 2018, pp. 187-210.

* cited by examiner

Architecture of Safety confined Hybrid Trajectory Generator

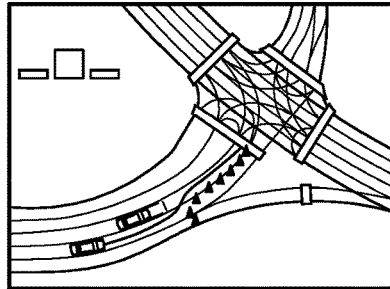
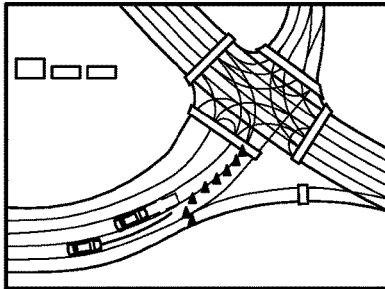
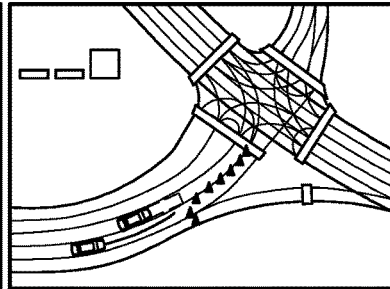
FIGURE 9A         FIGURE 9B         FIGURE 9C
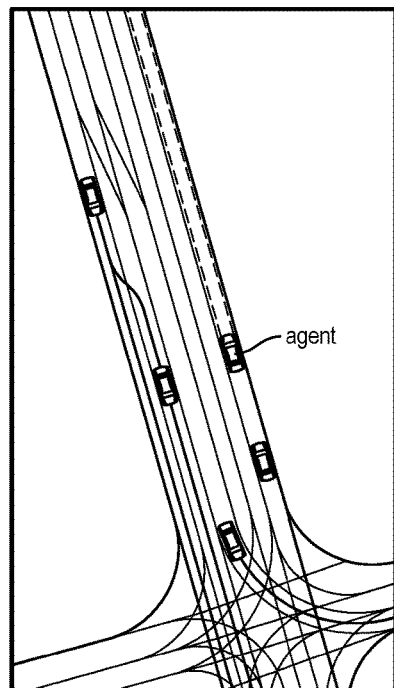
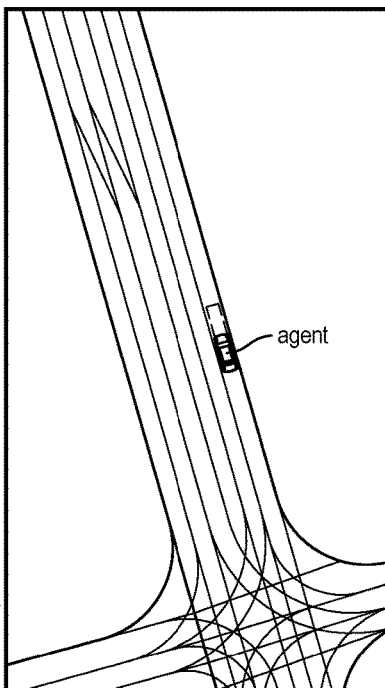
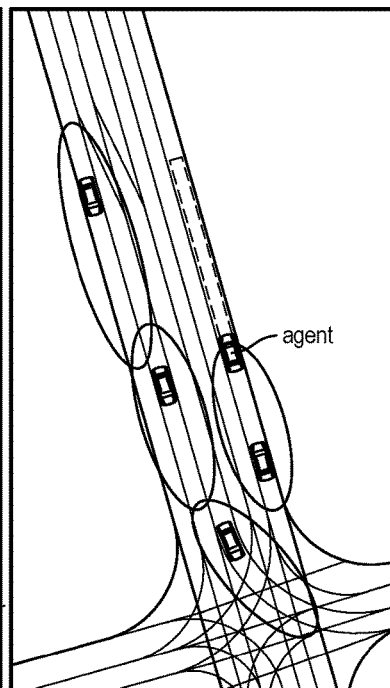
FIGURE 10A        FIGURE 10B        FIGURE 10C

METHOD AND SYSTEM FOR DETERMINISTIC TRAJECTORY SELECTION BASED ON UNCERTAINTY ESTIMATION FOR AN AUTONOMOUS AGENT

CROSS-REFERENCE TO RELATED APPLICATIONS

This application is a continuation of U.S. application Ser. No. 17/685,905, filed 3 Mar. 2022, which is a continuation of U.S. application Ser. No. 17/496,053, filed 7 Oct. 2021, which is a continuation of U.S. application Ser. No. 17/483,539, filed 23 Sep. 2021, which is a continuation of U.S. application Ser. No. 17/127,599, filed 18 Dec. 2020, which claims the benefit of U.S. Provisional Application No. 63/035,401, filed 5 Jun. 2020, and U.S. Provisional Application No. 63/055,794, filed 23 Jul. 2020, each of which is incorporated in its entirety by this reference.

TECHNICAL FIELD

This invention relates generally to the autonomous vehicle field, and more specifically to a new and useful system and method for deterministic trajectory selection using uncertainty estimation in the autonomous vehicle field.

BACKGROUND

In order for a system to achieve level 4 autonomy by removing the driver, it needs to be able to detect its own failures and self-enforce its Operational Design Domain (ODD). Many current systems and methods for autonomous driving use data-driven approaches and deep neural networks. While these approaches are advantageous in replicating human behavior (e.g., creating naturalistic driving trajectories as shown in FIG. 11), there are numerous limitations to these approaches, namely that they do not intrinsically provide an accurate estimate of the certainty of their outputs as compared to some classical methods (e.g., Kalman Filters). Additionally, many deep networks lack a general robustness to perturbations in their input space. This causes machine-learning-based methods to be difficult to implement in safety-critical applications, as there is always a risk that incoming data will lie outside the training set's distribution and thereby produce undefined behavior for the vehicle. As such, a learning-based method could fail without warning when presented with a novel scene and/or without an accurate understanding of the uncertainties in their outputs. While a classical fallback or emergency routine could be triggered as a response, this requires the failure to be known, and can be disruptive or dangerous to other drivers on the road.

Thus, there is a need in the autonomous vehicle field to create an improved and useful system and method for deterministic trajectory selection based on uncertainty estimation for an autonomous agent.

BRIEF DESCRIPTION OF THE FIGURES

FIGS. 9A-9C depicts a specific example of the agent encountering a dynamic vehicle obstacle in a construction zone.

FIGS. 10A-10C depict a specific example of sensor blindness.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
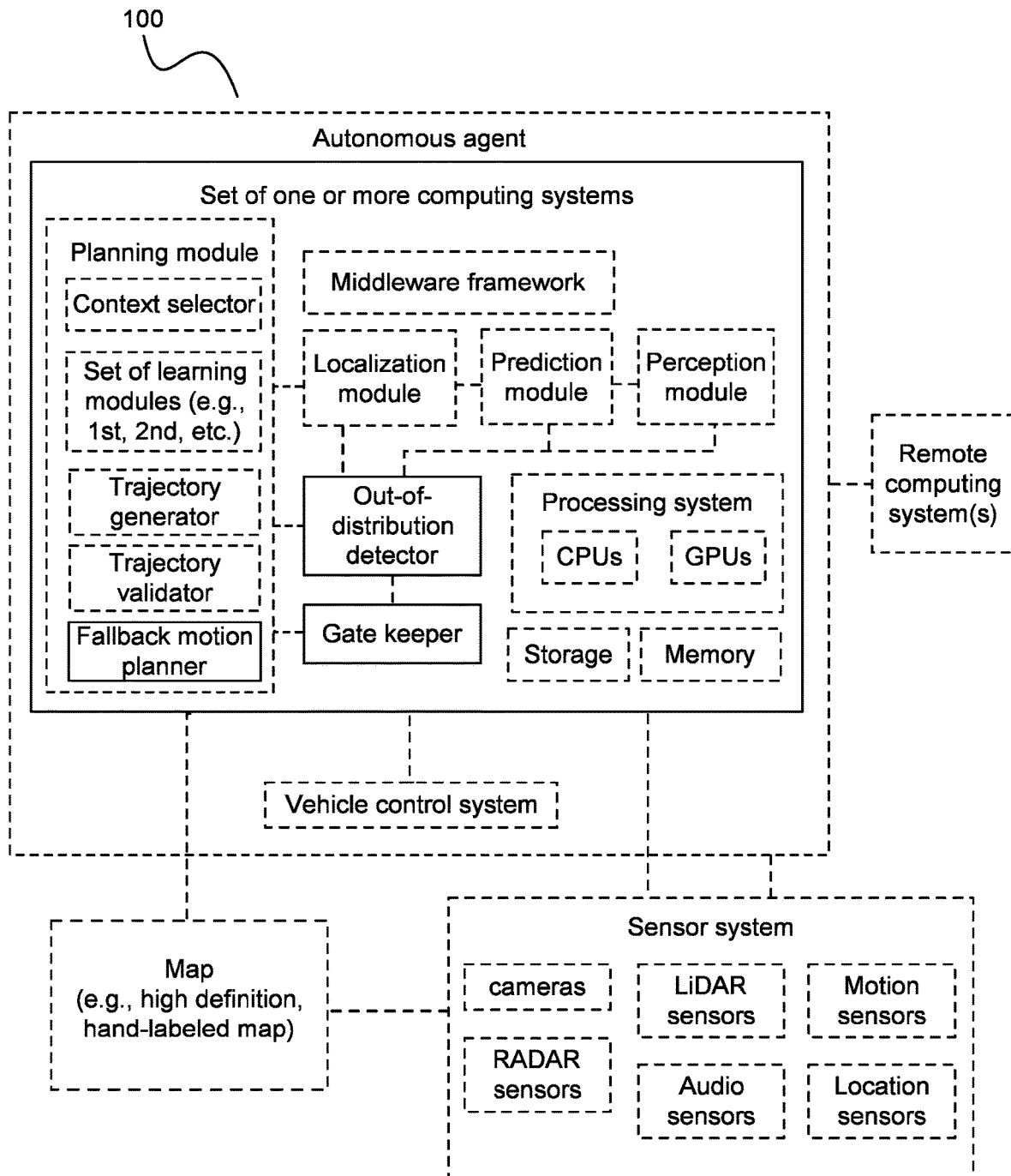
FIG. 1 is a schematic of a system for deterministic trajectory selection.

As shown in FIG. 1, a system 100 for deterministic trajectory selection based on uncertainty estimation includes a set of one or more computing systems. Additionally or alternatively, the system can include and/or interface with any or all of: an autonomous agent (equivalently referred to herein as an autonomous vehicle and/or an ego vehicle); a vehicle control system; a sensor system; and/or any other suitable components or combination of components.

Additionally or alternatively, the system 100 can include and/or interface with any or all of the systems, components, embodiments, and/or examples described in any or all of: U.S. application Ser. No. 17/116,810, filed 9 Dec. 2020, and U.S. application Ser. No. 17/125,668, filed 17 Dec. 2020, each which is incorporated herein in its entirety by this reference.

Figure 2:
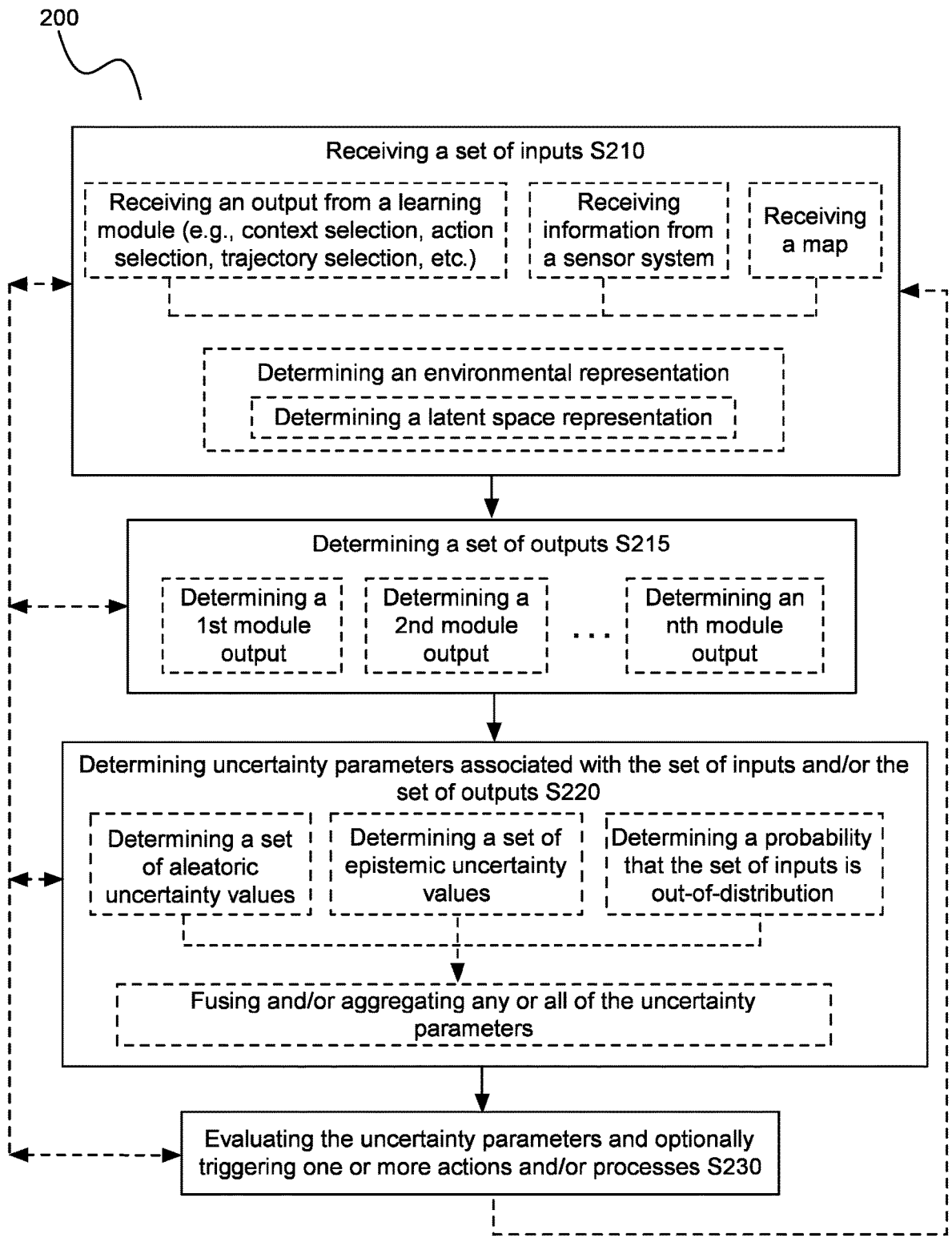
FIG. 2 is a schematic of a method for deterministic trajectory selection.

As shown in FIG. 2, a method 200 for deterministic trajectory selection includes receiving a set of inputs S210; determining a set of outputs S215; determining uncertainty parameters associated with any or all of the set of inputs and/or any or all of the set of outputs; and evaluating the uncertainty parameters and optionally triggering a process and/or action in response S230. Additionally or alternatively, the method 200 can include any other suitable processes and/or combination of processes.

Additionally or alternatively, the method 200 can include and/or interface with any or all of the methods, processes, embodiments, and/or examples described in any or all of: U.S. application Ser. No. 17/116,810, filed 9 Dec. 2020, and U.S. application Ser. No. 17/125,668, filed 17 Dec. 2020, each which is incorporated herein in its entirety by this reference.

The method 200 is preferably performed with a system 100 as described above, but can additionally or alternatively be performed with any other system(s).

2. Benefits

The system and method for deterministic trajectory selection using uncertainty estimation can confer several benefits over current systems and methods.

First, in some variations, the system and/or method confers the benefit of enabling an autonomous vehicle to achieve level 4 autonomy and safely traverse a route (e.g., fixed route) by calculating a set of uncertainty values at numerous points throughout the method and at various different modules (e.g., planning modules, perception modules, localization modules, context-aware learning modules, etc.) involved in the process of determining a trajectory, and implementing a fallback response (e.g., a deterministic trajectory selection) in an event that the uncertainty is too high. In specific examples, the system and method implement a traditional gate-keeper as a final stage in selecting the trajectory for the vehicle, which allows the entire path planner to maintain explainability through checks and balances. This not only prevents collision scenarios but also provides different layers of fallback behavior for different levels of uncertainty.

Second, in some variations, additional or alternative to those described above, the system and/or method implements a hybrid architecture including a combination of deep learning and classical methods, which confers both the classical benefits of providing accurate estimates of the certainty of its outputs as well as being robust to perturbations in input space, while producing human-like trajectories through deep learning. In other words, learned methods can offer "human-like" trajectories, but do not have an implicit ability to monitor deviations from the training set distribution. Similarly, they offer strong performance but limited safety guarantees. Conversely, classical methods produce trajectories that are not human-like and can fail to make progress in favor of defensive and lower speed options. A learned method often outperforms the classical method, but the risk of sudden failure due to an out-of-distribution example makes it difficult to rely on learned models for safety-critical applications, as an out-of-distribution example could, for instance, make a learned model crash without warning. In specific examples, the system and method implement an out-of-distribution detector within an architecture including both learned modules (e.g., $1^{st}$ set of learning modules for action selection, $2^{nd}$ set of learning modules for trajectory selection, etc.) and classically programmed modules (e.g., gate keeper, context selector, fallback motion planner, etc.).

Third, in some variations, additional or alternative to those described above, the system and/or method confers the benefit of not requiring the system and/or method to rely on the assumption that test data is identically distributed as the training data, and prevents the requirement that learned models of the system be trained on every possible use case in order for the agent to drive safely. Instead, the system and/or method can continuously calculate uncertainties and use those to trigger an action (e.g., a fallback) if needed.

Fourth, in some variations, additional or alternative to those described above, the system and/or method confers the benefit of reducing the likelihood and/or occurrence of unknown scenarios due a fixed route, limited ODD architecture, which enables the system and method to know with higher certainty what is usual/in-distribution. In specific examples, for instance, the system and/or method are overfit to a set of trained fixed routes, wherein the training data and the test data both correspond to the same fixed route. In these examples, this enables out-of-distribution test data to be determined with high confidence.

Fifth, in some variations, additional or alternative to those described above, the system and/or method confers the benefit of not requiring conventionally acceptable fallback mechanisms for agents which carry human passengers (e.g., robo-taxis). This can enable, for instance, the autonomous agent to overfit to the trained route and have frequently stopping and/or pulling over serve as an acceptable fallback mechanism. In specific examples, for instance, the autonomous agents are used for the delivery of goods between locations connected by a fixed route, wherein in an event that a fallback mechanism is triggered, no human passengers are bothered by the particular fallback.

Sixth, in some variations, additional or alternative to those described above, the system and/or method confers the benefit of determining a set of one or more uncertainties associated with each of a set of multiple learned models (e.g., deep neural networks) used to determine a trajectory of the autonomous agent, wherein the set of uncertainties accompanies each of the set of outputs of the learned models. In specific examples, these uncertainties are aggregated as the series of models is processed, wherein the aggregated uncertainties can be used to alter the performance of a subsequent model, modulate the output of one or models, trigger the use of a fallback trajectory from a classical motion planner, trigger the implementation of a minimal risk scenario, and/or otherwise affect the performance of the method 200.

Additionally or alternatively, the system and method can confer any other benefit(s) and/or combination of benefits.

3. System

As shown in FIG. 1, a system 100 for deterministic trajectory selection based on uncertainty estimation includes a set of one or more computing systems. Additionally or alternatively, the system can include and/or interface with any or all of: an autonomous agent (equivalently referred to herein as an autonomous vehicle and/or an ego vehicle); a vehicle control system; a sensor system; and/or any other suitable components or combination of components.

The system 100 functions to perform the processing involved in trajectory generation and validation, along with the implementation of a fallback and/or fail-safe decision (e.g., action, trajectory, etc.) in an event that an uncertainty associated with any or all of the outputs is deemed too high (e.g., above a set of one or more predetermined thresholds, not satisfying of a set of validation constraints and/or rules, etc.). Additionally or alternatively, the system 100 can function to operate the autonomous agent (e.g., with a control system), determine any other outputs and/or otherwise process any suitable inputs, and/or can perform any other suitable functions.

The system 100 is preferably configured to implement and/or interface with a system which implements a hybrid architecture of decision making and trajectory generation (e.g., as shown in FIG. 3, FIG. 12, FIG. 13, FIG. 14, etc.), and optionally any other processes involved in autonomous agent operation, wherein the hybrid architecture implements both classical, rule-based approaches and machine learning approaches. This is further preferably enabled through a constrained and/or structured ODD, fixed-route driving framework. This functions to maintain explainability of the vehicle's decision making while enabling the vehicle to drive with human-like driving behavior on routes validated with minimal training data.

In preferred variations, the system's hybrid architecture uses a set of learned models to determine trajectories for the vehicle, wherein uncertainties associated with the learning modules (and optionally other components of the method) are estimated and used to determine if a classically programmed fallback (e.g., selecting a deterministic trajectory) should be implemented. Additionally or alternatively, the system 100 can include any other learned and/or programmed components anywhere throughout the autonomous agent operation stack.

Figure 15A:
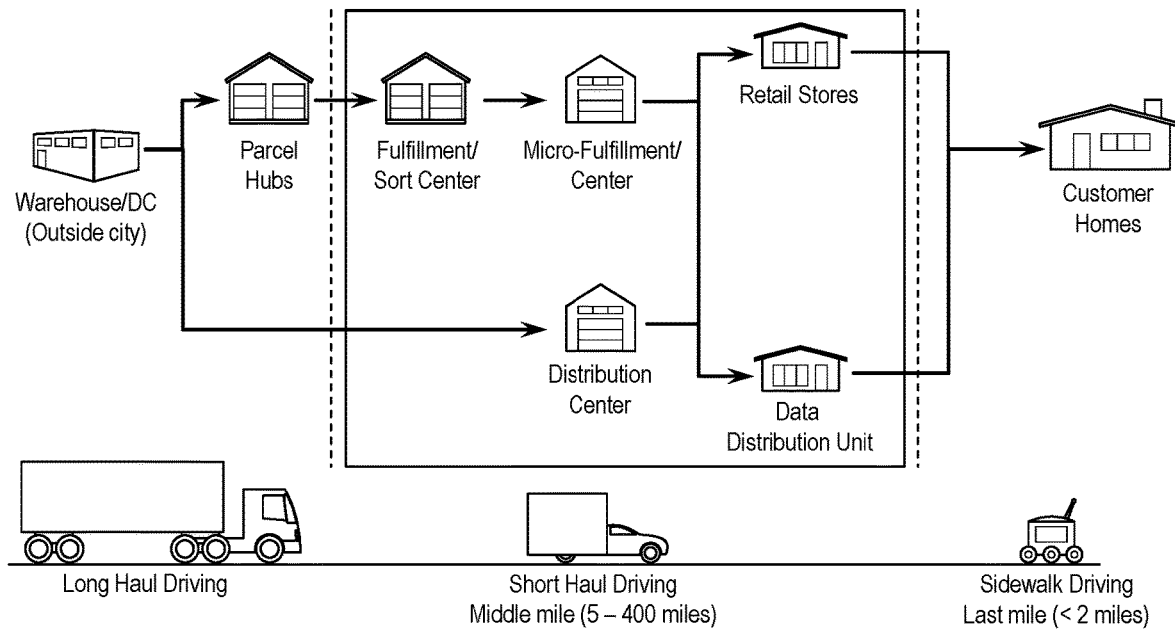
FIGS. 15A-15B depict a variation of a use case of an autonomous vehicle in fixed-route deliveries and a schematic of fixed routes driven by the vehicles.
Figure 15B:
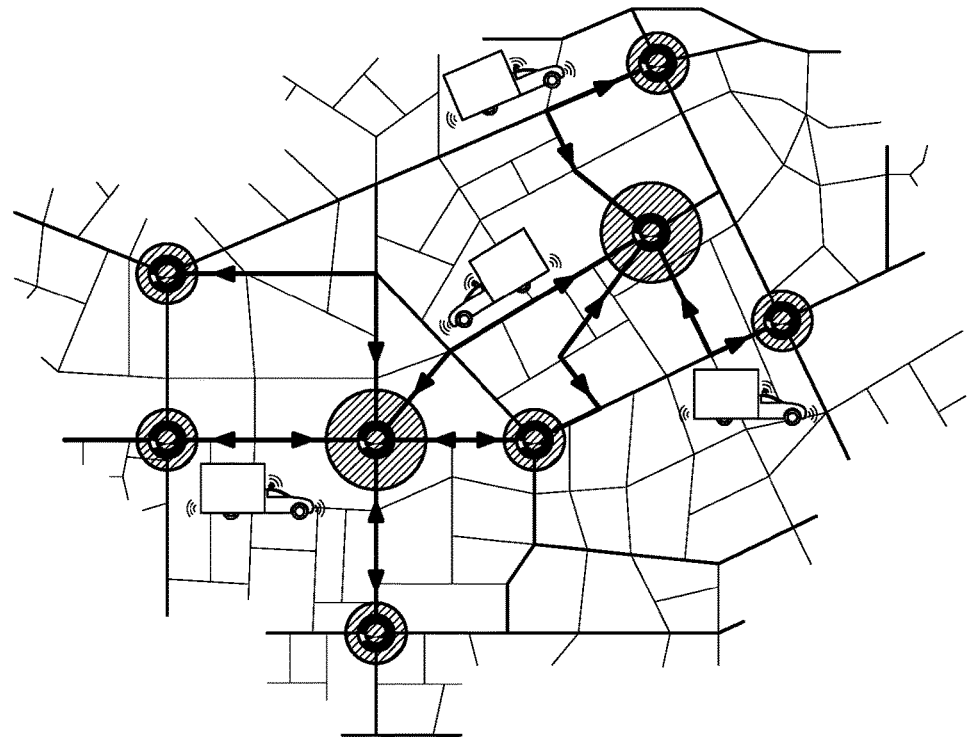

In a first set of variations, as shown in FIGS. 15A-15B, the system 100 is implemented in autonomous short-haul (e.g., between 5 and 400 miles) B2B fixed-route applications. In these variations, the autonomous agents preferably receive inventory from sorting centers, but can additionally or alternatively receive inventory for parcel hubs and/or warehouses. The agent then preferably delivers the inventory to and/or between any or all of: sorting centers, micro-fulfillment centers, distribution centers, retail stores, and local delivery centers. Additionally or alternatively, the agents can interface with residences (e.g., customer homes), and/or any other suitable locations/facilities.

Additionally or alternatively, the system 100 can be implemented in any other suitable way(s).

3.1 System—Components

The system 100 includes a computing system, which can function to perform any or all of: uncertainty estimation (e.g., including out-of-distribution detection), decision making, trajectory generation, fallback motion planning (e.g., generating a fallback trajectory with a classical motion planner), emergency planning, trajectory validation, and/or any other processes of an autonomous agent. Additionally or alternatively, the computing system can function to perform any or all of: perception; localization (e.g., localization of the vehicle and/or surrounding objects at a localization module); prediction (e.g., path prediction of the vehicle and/or objects surrounding the vehicle at a prediction module); storage of information; and/or any other suitable functions.

The computing system is preferably configured to implement centralized and parallel computing which enables any or all of: high concurrency of task execution, low latency, high data throughput, and/or any other suitable benefits. Additionally or alternatively, the computing system can be configured to perform any other computing and/or processing (e.g., decentralized computing, distributed computing, serial computing, etc.) and/or can confer any other suitable benefits.

Additionally or alternatively, the system and/or computing system can be otherwise configured and/or designed.

The computing system is preferably arranged at least partially onboard (e.g., integrated within) the autonomous agent.

In preferred variations, the autonomous agent includes an autonomous vehicle that is preferably a fully autonomous vehicle and/or able to be operated as a fully autonomous vehicle, but can additionally or alternatively be any semi-autonomous or fully autonomous vehicle, a teleoperated vehicle, and/or any other suitable vehicle. The autonomous vehicle is preferably an automobile (e.g., car, driverless car, bus, shuttle, taxi, ride-share vehicle, truck, semi-truck, etc.). Additionally or alternatively, the autonomous vehicle can include any or all of: a watercraft (e.g., boat, water taxi, etc.), aerial vehicle (e.g., plane, helicopter, drone, etc.), terrestrial vehicle (e.g., 2-wheeled vehicle, bike, motorcycle, scooter, etc.), and/or any other suitable vehicle and/or transportation device, autonomous machine, autonomous device, autonomous robot, and/or any other suitable device.

The computing system can additionally or alternatively be arranged remote from the autonomous agent, such as a cloud computing system. The remote computing system is preferably in communication with the onboard computing system (e.g., to collect information from the onboard computing system, to provide updated models to the onboard computing system, etc.), but can additionally or alternatively be in communication with any other suitable components.

The computing system preferably includes active and redundant subsystems, but can additionally or alternatively include any other suitable subsystems.

To enable this, the computing system is preferably designed at least partially in a modular format including a set of modular computing components, referred to herein as learning modules (equivalently referred to herein as learning agents or learning models), each associated with predefined inputs and outputs. Each computing component contains a specific algorithm module built to process a set of data inputs and generate a set of outputs. The computing system can optionally include middleware framework, which extracts dependencies from these components and links them all together (e.g., with a topological ordering process such as a directed acyclic graph, etc.). At runtime, for instance, the framework takes the predefined components described above and combines them with fused data from the sensors to create lightweight user-level tasks. Each task is then scheduled based on resource availability and task priorities and executed as optimized threads.

Additionally or alternatively, the system and/or computing system can be otherwise configured and/or designed.

The computing system(s) and/or any other components of the system preferably include, interface with, and/or implement a set of modules, which can include any or all of: a mapping module, a perception module (e.g., which collects and/or determines information associated with static and/or dynamic objects in an environment of the user, which determines a context of the autonomous agent, etc.), a prediction module, a localization module, a planning module (e.g., including a $1^{st}$ set of learning modules and a $2^{nd}$ set of learning modules, etc.), a routing module, a control module, any other module(s), and/or any combination of modules (e.g., localization and mapping module, perception and prediction module, etc.).

One or more of the set of modules is preferably organized into a set of layers, which describe a functionality of one or more components of the module. The planning module (e.g., planning module for context-aware decision making and trajectory generation as shown in FIG. 14), for instance, is preferably organized into a performance layer including a set of learned models (equivalently referred to herein as any or all of: learning agents, learning modules, learning micro-modules, deep networks, and/or any other suitable terms)

which generate a trajectory for the agent; a fallback layer including fallback classical motion planner, which generates a programmed fallback trajectory; a fail-safe layer including an emergency planner which can prescribe minimum risk movements and/or actions and/or trajectories for the vehicle (e.g., in an event that the fallback classical motion planner cannot be trusted); and a validation layer including a gatekeeper which selects from a learned trajectory from the performance layer and a programmed trajectory from the fallback layer, and optionally triggers the emergency planner (e.g., if neither trajectory is safe). In specific examples, the planning module includes a performance layer which includes a set of learned models (e.g., as described below) which generate a learned trajectory for the agent; one or more fallback layers (e.g., for the whole performance layer, for each learned model in the performance layer, for the planning module, for other modules, etc.) which provides a traditionally programmed set of algorithms that the stack can fallback to in case the performance layer has low confidence in its inputs and/or outputs; a fail-safe layer which serves as the ultimate layer that the vehicle exercises in the extreme cases of very high uncertainty of the surrounding world or complete failure of any of the modules; and a final validation layer which acts as a gatekeeper to validate the outputs from previous layers and provide the final safe validated output of that particular module.

Additionally or alternatively, the planning module can be organized into any other layers and/or contain any other components; these layers can be otherwise arranged and/or including any other components; any other module can include these or other layers and/or components; and/or the system 100 can be otherwise organized.

Figure 14:
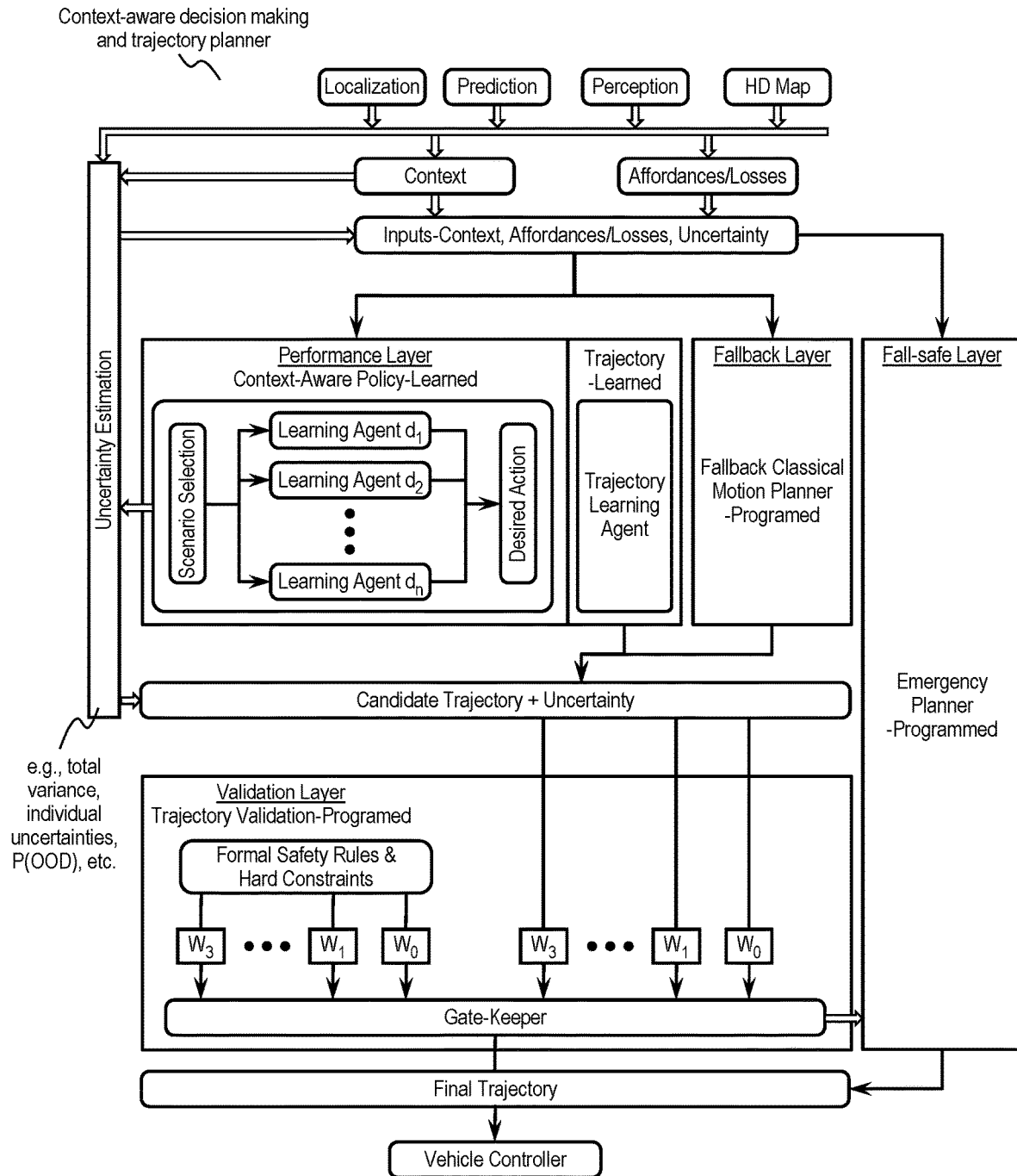
FIG. 14 depicts a schematic variation of the system.

The set of learned models of the performance layer is preferably a set of data-driven learned models (e.g., as shown in FIG. 14, as shown in FIGS. 3A-3D), which function to enable the agent to capture the nuances of human driving instead of only implementing a set of predefined rules which are unable to handle every scenario. Each of the learned models is preferably a deep neural network, but can additionally or alternatively include any other machine learning model and/or algorithm.

In preferred variations (e.g., as shown in FIGS. 3A-3D), the performance layer includes a $1^{st}$ set of multiple learned models which function to determine an action of the agent (e.g., based on context), wherein each of the $1^{st}$ set of learned models is equivalently referred to herein as a deep decision network, and a $2^{nd}$ set of multiple learned models which function to determine a trajectory for the agent based on a selected action (e.g., from the $1^{st}$ learned model), wherein each of the set of $2^{nd}$ learned models is equivalently referred to herein as a deep trajectory network. Additionally or alternatively, the learned models can include any other suitable learned models configured to determine any suitable outputs based on any suitable inputs.

In specific examples, an action for the agent is determined based on selecting one model of the $1^{st}$ set of multiple learned models based on a context of the agent (e.g., a predetermined context assigned to a map which the agent references based on a pose and/or other location parameter of the agent), wherein the selected $1^{st}$ model and the context are associated (e.g., assigned) in a 1:1 fashion. Vehicle actions can include, for instance, but are not limited to, any or all of: stopping behind a vehicle, yielding to a vehicle, merging onto a road, and/or any other suitable actions. A trajectory (equivalently referred to herein as a learned trajectory) is selected for the agent based on selecting one model of the $2^{nd}$ set of multiple learned models based on the action, wherein the selected $2^{nd}$ model and the action are associated (e.g., assigned) in a 1:1 fashion. Additionally or alternatively, multiple learned models can be selected; the learned models can be assigned and/or selected in any other suitable way(s) and based on any other suitable information; the $1^{st}$ learned models can include only a single models; the $2^{nd}$ learned models can include only a single model; and/or learned models can be implemented in any other suitable ways.

Additionally or alternatively, system can include only the $2^{nd}$ set of learned models (e.g., wherein the action is determined with a programmed and/or rule-based process), only the $1^{st}$ set of learned models, other learned models, and/or any other suitable number of learned models.

Each of the learned models preferably includes one or more machine learning models such as one or more deep learning models and/or neural networks (e.g., deep neural networks [DNNs], convolutional neural networks [CNNs], recurrent neural networks [RNNs], inverse reinforcement learning [IRL] model, reinforcement learning [RL] model, imitation learning [IL] model, etc.), but can additionally or alternatively include any suitable models and/or algorithms. The learned models of the $1^{st}$ and $2^{nd}$ set of learned models are preferably the same type (e.g., with the same number of layers, with different numbers of layers, etc.), but can additionally or alternatively be different types. The system 100 further preferably includes and/or interfaces with any other modules including learned models of the agent, such as any or all of: a perception module, a prediction module, and a localization module, wherein uncertainties are calculated at every module. Additionally or alternatively, uncertainties can be calculated at any subset of modules, additional modules, and/or any other suitable modules.

In a first set of variations, each of the learned models (e.g., deep decision networks, deep trajectory networks, etc.) includes a neural network, wherein each of the neural networks of the $1^{st}$ set of learned models is trained for a particular context of the autonomous agent (e.g., trained based on training data corresponding to that context, trained based only on training data from that particular context, trained based on data of that context from the particular fixed route being traveled by the agent, etc.), and wherein each of the neural networks of the $2^{nd}$ set of learned models is trained for a particular action of the autonomous agent (e.g., trained based on training data corresponding to that action, trained based only on training data from that particular action, trained based on data from that action and the selected context, trained based on data of that action from the particular fixed route being traveled by the agent, etc.).

In specific examples, each of the learned models is a deep learning network (DNN) (e.g., neural network), further preferably a Q-learning network trained using an Inverse Reinforcement learning technique and/or process, wherein the number of layers (e.g., hidden layers) of the neural network can vary for different contexts and/or actions (e.g., between 3-8 layers, 3 or less layers, 8 or more layers, between 2 and 10 layers, between 1 and 15 layers, etc.). Additionally or alternatively, any other suitable networks, algorithms, and/or models can be used in the learning module(s), such as, but not limited to, any or all of: policy gradient methods, finite state machines [FSMs], probabilistic methods (e.g., Partially Observable Markov Decision Process [POMDP]), imitation learning [IL], RL or variations of IRL, and/or any other suitable models and/or networks and/or algorithms. Each of the learned models (equivalently referred to herein as learning modules) is preferably the same type of neural network (e.g., with different numbers of layers, different weights, etc.) and/or algorithm and/or model, but can alternatively be different (e.g., have different architectures, different neural network types, etc.).

Each of the learning models is further preferably trained with inverse reinforcement learning, which functions to determine a reward function and/or an optimal driving policy for each of the context-aware learning modules. The output of this training is further preferably a compact fully-connected network model that represents the reward function and an optimal policy for each learning module. Additionally or alternatively, the learning modules can be otherwise suitably trained (e.g., with reinforcement learning, etc.) and/or implemented.

The system further preferably includes and/or interfaces with: an out-of-distribution detector, which functions to assess the probability of inputs being out-of-distribution relative to training data; a fallback classical motion planner, which functions to determine a fallback trajectory for the agent based on classical, programmed processes; a gate keeper, which functions to validate a candidate trajectory for the vehicle and/or revert to the programmed trajectory from the fallback motion planner and/or a minimum-risk trajectory from an emergency planner; and the emergency planner. Additionally or alternatively, the system can include and/or interface with a subset of these, none of these, and/or any other suitable components.

The out-of-distribution detector preferably determines an uncertainty associated with input data, wherein the uncertainty for the out-of-distribution detector is further preferably in the form of a probability (e.g., probability that the data is in distribution, probability that the data is out of distribution, etc.). thereby enabling a determination of whether or not the input data can be trusted to be determined. The out-of-distribution detector further preferably computes probability for at least the one or more modules involved in decision making and trajectory generation for the agent (e.g., the planning module), but can additionally or alternatively calculate probabilities and/or other parameters for any other modules of the agent (e.g., localization module, prediction module, perception module, etc.). Additionally or alternatively, the system 100 can include any other components and/or detectors for determining uncertainty.

The fallback motion planner is preferably a classical motion planner which executes a deterministic series of actions through a programmed fallback trajectory for the autonomous agent, such as in an event that an uncertainty associated with a trajectory from a learned model and/or any intermediate outputs involved in determining the trajectory is sufficiently high (e.g., above a threshold). In such events, rather than using a trajectory generated by the learned model(s), the system and method can divert to the fallback motion planner to navigate cautiously through the environment and output a safe and efficient path from the current state to the next goal state. The programmed trajectory is preferably a sequence of location and speed pairs for the agent, but can additionally or alternatively be in any other form.

The gate keeper is preferably in communication with the out-of-distribution detector, and functions to receive uncertainty value(s) (e.g., from the modules, probabilities from the out-of-distribution detector, etc.) and compare the value (s) with one or more thresholds, conditions, and/or rules, wherein in an event that the uncertainty is deemed too high, selects the fallback response (e.g., programmed fallback trajectory/deterministic trajectory) for the agent (e.g., over the learned trajectory) and/or triggers the emergency planner. Additionally or alternatively, the gatekeeper can trigger any suitable outcome.

The emergency planner is preferably in communication with the gatekeeper and functions to produce a fail-safe recovery behavior in an event that the system is not satisfactorily confident in the fallback trajectory. If one or more of the uncertainty values is above an extreme upper threshold, for instance, indicating that even the fallback layer is not reliable (e.g. data from all sensors is not received causing sensory-blindness), the vehicle can default to a fail-safe recovery behavior prescribed by the emergency planner. Additionally or alternatively, the emergency planner can be otherwise triggered and/or implemented to determine any suitable output(s).

The computing system further preferably includes a processing system, which functions to process the inputs received at the computing system. The processing system preferably includes a set of central processing units (CPUs) and a set of graphical processing units (GPUs), but can additionally or alternatively include any other components or combination of components (e.g., processors, microprocessors, system-on-a-chip (SoC) components, etc.).

The computing system can optionally further include any or all of: memory, storage, and/or any other suitable components.

In addition to the planning module, the computing system can include and/or interface with any or all of: a localization module, prediction module, perception module, and/or any other suitable modules for operation of the autonomous agent.

The computing system (e.g., onboard computing system) is preferably in communication with (e.g., in wireless communication with, in wired communication with, coupled to, physically coupled to, electrically coupled to, etc.) a vehicle control system, which functions to execute commands determined by the computing system.

The computing system can include and/or interfaces with a map, which functions to at least partially enable the determination of a context associated with the autonomous agent. The map is preferably a high definition, hand-labeled map as described below, which prescribes the context of the autonomous agent based on its location and/or position within the map, but can additionally or alternatively include any other map and/or combination of maps.

The system 100 preferably includes and/or interfaces with a sensor system, which functions to enable any or all of: a localization of the autonomous agent (e.g., within a map), a detection of surrounding objects (e.g., dynamic objects, static objects, etc.) of the autonomous agent, the collection of a set of inputs, and/or any other suitable function.

The sensor system can include any or all of: cameras (e.g., 360-degree coverage cameras, ultra-high resolution cameras, etc.), light detection and ranging (LiDAR) sensors, radio detection and ranging (RADAR) sensors, motion sensors (e.g., accelerometers, gyroscopes, inertial measurement units [IMUs], speedometers, etc.), location sensors (e.g., Global Navigation Satellite System [GNSS] sensors, Inertial Navigation System [INS] sensors, Global Positioning System [GPS] sensors, any combination, etc.), ultrasonic sensors, and/or any suitable sensors.

In a set of variations, the sensor system includes: 16-beam LIDARs (e.g., for high fidelity obstacle detection, etc.); short range RADARs (e.g., for blind spot detection, cross traffic alert, emergency braking, etc.); ultrasonic sensors (e.g., for park assist, collision avoidance, etc.); 360-degree coverage cameras (e.g., for surround view for pedestrian/ cyclist/urban obstacle detection and avoidance, etc.); 128-beam LIDAR (e.g., for localization of vehicle with high precision); long range ultra-high resolution cameras (e.g., for traffic sign and traffic light detection); long range RADARs (e.g., for long range obstacle tracking and avoidance); GNSS/INS (e.g., for ultra high precision localization); and/or any other suitable sensors.

Additionally or alternatively, the system 100 can include any other suitable components or combination of components.

4. Method

As shown in FIG. 2, the method 200 includes receiving a set of inputs S210; determining a set of outputs S215; determining uncertainty parameters associated with any or all of the set of inputs and/or any or all of the set of outputs; and evaluating the uncertainty parameters and optionally triggering a process and/or action in response S230. Additionally or alternatively, the method 200 can include any other suitable processes and/or combination of processes.

The method 200 functions to enable an autonomous agent to detect its own failures and self-enforce its operational design domain (ODD). The method 200 can additionally or alternatively function to generate one or more deterministic trajectories (e.g., with a learned model, with a fallback motion planner, with an emergency planner, etc.); initiate a fallback and/or minimal risk trajectory; address various sources of error; aggregate different types and/or sources of uncertainty; enable the safe traversal of a route; and/or perform any other suitable function.

The method 200 is preferably performed with a system 100 as described above, but can additionally or alternatively be performed with any other suitable system(s).

4. Method—Receiving a Set of Inputs S210

The method 200 includes receiving a set of inputs S220, which functions to receive information with which to perform subsequent processes of the method. This can include information with which to perform, for instance, any or all of: determining one or more outputs (e.g., outputs of learned models, intermediate outputs, etc.); calculating one or more uncertainty values; determining if data is in-distribution or out-of-distribution; and/or for use in performing any other suitable processes. Additionally or alternatively, S210 can function to trigger one or more processes; inform any or all of the modules of the autonomous agent (e.g., perception, prediction, localization, planning, etc.); be used to otherwise operate an autonomous agent; and/or perform any other suitable locations.

S210 is preferably performed continuously throughout the method 200, further preferably throughout the operation of an agent along a route, such as any or all of: continuously, at a predetermined frequency, at random intervals, prior to each of a set of processes of the method 200, and/or at any other suitable times. S210 can additionally or alternatively be performed in response to a trigger (e.g., based on a map, in response to a context being selected, based on sensor information, etc.), at a set of intervals (e.g., random intervals), and/or at any other suitable time(s) during the method 200.

S210 is preferably performed with a system 100 as described above, further preferably with an onboard computing system and an onboard sensor system of the autonomous agent, but can additionally or alternatively be performed with any other components of the system and/or any other suitable systems.

The set of inputs preferably includes information received from a perception module of the autonomous agent, such as the sensor system, and/or determined (e.g., calculated) based on sensors in the sensor system (e.g., via a perception module), but can additionally or alternatively be received from any suitable sources (e.g., internet, autonomous agent, historical information, remote computing system, etc.).

The set of inputs can include any or all of: a current state of the agent (e.g., position, heading, pitch, acceleration, deceleration, etc.); information associated with a set of dynamic objects (e.g., current position, size, previous path, predicted path, etc.) such as those proximal to the agent; information associated with a set of static objects (e.g., traffic cones, mailboxes, etc.) such as those proximal to the agent (e.g., current state of static object, historical information associated with static object, etc.); a map and/or information from a map (e.g., HD map; hand-labeled map indicating a set of assigned contexts; automatically-labeled map indicating a set of assigned contexts; map indicating lane boundaries, connections between lane lines, positions of lanes, connectivity of lanes, semantic information, etc.; etc.); routing information required to reach a destination (e.g., ideal path to take, sequence of lanes to take, etc.); one or more uncertainty values and/or estimates (e.g., epistemic uncertainty, aleatoric uncertainty, etc.); autonomous agent state (equivalently referred to herein as the ego vehicle state); and/or any other suitable inputs.

In one set of variations, for instance, the set of inputs includes a high definition, labeled (e.g., hand-labeled, automatically-labeled, etc.) map which prescribes the context of the autonomous agent at any given time based on its location and/or orientation (e.g., pose) within the map, but can additionally or alternatively include any other map (e.g., map labeled in an automated fashion, map labeled through both manual and automated processes, etc.) and/or combination of maps. In additional or alternative variations, the map information includes any or all of: road infrastructure information and/or other static environment information, route information, and/or any other suitable information.

In specific examples, the map prescribes one or more contexts (and/or transition zones) selected based on (e.g., predetermined/assigned to) a region/location of the autonomous agent (e.g., as determined based on sensor information as described above).

The set of inputs preferably include sensor information collected at a sensor system of the autonomous agent, such as any or all of: a sensor system onboard the autonomous agent, a sensor system remote from the autonomous agent, and/or a sensor system in communication with the autonomous agent and/or a computing system (e.g., onboard computing system, remote computing system, etc.) of the autonomous agent. Additionally or alternatively, the sensor information can be collected from any other suitable sensor(s) and/or combination of sensors, S210 can be performed in absence of collecting sensor inputs, and/or S210 can be performed in any other suitable way(s).

The sensor information can include and/or be used to determine location information associated with the autonomous agent, such as any or all of: position, orientation (e.g., heading angle), pose, geographical location (e.g., using global positioning system [GPS] coordinates, using other coordinates, etc.), location within a map, and/or any other suitable location information. In preferred variations, for instance, S205 includes receiving pose information from a localization module of the sensor subsystem, wherein the localization module includes any or all of: GPS sensors, IMUs, LIDAR sensors, cameras, and/or any other sensors (e.g., as described above). Additionally or alternatively, any other sensor information can be received from any suitable sensors.

The sensor information can additionally or alternatively include and/or be used to determine motion information and/or other dynamic information associated with the autonomous agent, such as, but not limited to, any or all of: velocity/speed, acceleration, and/or any other suitable information.

The sensor information can additionally or alternatively include and/or be used to determine (e.g., at a perception module) location information and/or motion information associated with one or more dynamic objects in an environment of the autonomous agent, such as any or all of the location information described above, location information relative to the autonomous agent, motion information of the dynamic objects, predicted information (e.g., predicted trajectory), historical information (e.g., historical trajectory), and/or any other suitable information. The dynamic objects can include, but are not limited to, any or all of: other vehicles (e.g., autonomous vehicles, non-autonomous vehicles, 4-wheeled vehicles, 2-wheeled vehicles such as bicycles, etc.), pedestrians (e.g., walking, running, rollerblading, skateboarding, etc.), animals, and/or any other moving objects (e.g., ball rolling across street, rolling shopping cart, etc.). Additionally or alternatively, the sensor information can include any other information associated with one or more dynamic objects, such as the size of the dynamic objects, an identification of the type of object, other suitable information, and/or the information collected in S205 can be collected in absence of dynamic object information.

The sensor information can additionally or alternatively include and/or be used to determine (e.g., at a perception module) location information and/or other information associated with one or more static objects (e.g., stationary pedestrians, road infrastructure, construction site and/or construction equipment, barricade(s), traffic cone(s), parked vehicles, etc.) in an environment of the autonomous agent, such as any or all of the information described above (e.g., identification of object type, etc.). Additionally or alternatively, the sensor information can include any other information associated with one or more static objects and/or the information collected in S210 can be collected in absence of static object information.

The set of inputs can include a vehicle context, which specifies an environment of the vehicle, and can function to characterize a driving context of the vehicle. The context is preferably prescribed based on a fixed route selected for the vehicle, and based on a map (e.g., high-definition, hand labeled map), such as a map as described above and/or any other suitable map(s). The context can additionally or alternatively be determined based on any or all of: sensor information from the sensor system such as the location of the agent, and/or any other suitable information.

In preferred variations, for instance, the contexts are assigned to locations and/or regions within the map. Each location and/or region in the map can be assigned any or all of: a single context; multiple contexts (e.g., indicating an intersection of multiple routes, wherein a single context is selected based on additional information such as any or all of the inputs received in S205, etc.); no context (e.g., indicating a location and/or region not on a fixed route option for the autonomous agent); and/or any combination of contexts. The particular context(s) assigned to the location and/or region are preferably determined based on the static environment at that location and/or within that region, such as any or all of: features of the roadway within that region (e.g., number of lanes, highway vs. residential road, one-way vs. two-way, dirt and/or gravel vs. asphalt, curvature, shoulder vs. no shoulder, etc.); landmarks and/or features within that region (e.g., parking lot, roundabout, etc.); a type of zone associated with that location and/or region (e.g., school zone, construction zone, hospital zone, residential zone, etc.); a type of dynamic objects encountered at the location and/or region (e.g., pedestrians, bicycles, vehicles, animals, etc.); traffic parameters associated with that location and/or region (e.g., speed limit, traffic sign types, height limits for semi trucks, etc.); and/or any other environmental information.

Additionally or alternatively, the assignment of contexts can take into account a set of fixed routes of the vehicle, wherein the map prescribes a sequential series of contexts which the vehicle encounters along the fixed route, wherein the vehicle's location within the map specifies which of these sequential contexts the vehicle is arranged within, and wherein the vehicle switches contexts proximal to (e.g., at) the transition between contexts.

In some variations, the map includes (e.g., assigns, prescribes, etc.) one or more transition zones which are arranged between different contexts, and can indicate, for instance, a change in context (e.g., along a fixed route, along a dynamically determined route, etc.), thereby enabling a switching of contexts to occur smoothly (e.g., by defining an action space. Assigning transition zones can function, for instance, to define an action space subsequently in the method which smoothly transitions the vehicle from one context to the next (e.g., preventing the availability of certain actions, prescribing that the agent maintain his or her lane, preventing a turn, etc.) and/or triggers any other process (e.g., the selection of a new $1^{st}$ learning module). The transition zones can be any or all of: overlapping with (e.g., partially overlapping with, fully overlapping with, etc.) one or more contexts; non-overlapping with one or more contexts; and/or any combination of overlapping and non-overlapping. Additionally or alternatively, the transition zones can be contexts themselves; the method can be performed in absence of labeled transition zones (e.g., by anticipating the subsequent context); and/or be otherwise performed.

Examples of contexts can include, but are not limited to, any or all of: a one-lane residential road (e.g., in which the agent cannot change contexts due to road geometry); a one-lane non-residential road; a multi-lane highway (e.g., in which the agent can learn it is less likely to see pedestrians); a single lane road in a parking lot; a single lane road with a yellow boundary on the side; a multi-lane fast moving road; regions connecting to roads (e.g., parking lot, driveway, etc.); and/or any other suitable contexts.

The vehicle context is preferably used in subsequent processes of the method, further preferably in the selection of a $1^{st}$ learning module (e.g., as described below), which simplifies and/or specifies the available actions to the autonomous agent. Additionally or alternatively, the context can be used to determine a scenario which is used in subsequent processes of the method, wherein the scenario functions to further specify the context, such as based on any or all of the information described above (e.g., speed limit, sensor information of objects surrounding vehicle, etc.). Examples of scenarios for a first context of (e.g., a two-way residential road) include, but are not limited to, any or all of:

a right turn opportunity; an addition of a right turn lane; a stop sign; a traffic light; a yield sign; a crosswalk; a speed bump; and/or any other scenarios. Examples of scenarios for a second context (e.g., a multi-lane highway) include, but are not limited to, any or all of: lane changing; merging; overtaking a slow-moving vehicle; and/or any other scenarios. In some variations, for instance, the context triggers the selection of a model and/or algorithm (e.g., a highly-tuned, context-aware custom inverse reinforcement learning (IRL) algorithm), which makes high-level scenario selection and calls a scenario-specific learning module (e.g., a $1^{st}$ learning module as described below) to select an action of the vehicle. Additionally or alternatively, any other suitable algorithms or processes for selecting a scenario can be implemented, an action can be selected in absence of a scenario, a context can be used to select another parameter, and/or the method 200 can be otherwise performed.

Additionally or alternatively, the method 200 can include determining the vehicle context and/or scenario (e.g., from the map and sensor information, from sensor information alone, from other information, etc.) and/or otherwise using a vehicle context, scenario, and/or other information relevant to an environment of the vehicle.

S210 can optionally include determining an environmental representation of the agent based on the set of inputs, wherein the environmental representation can be used as input to any or all of the modules and/or models (e.g., as described below). In preferred variations, the environmental representation is determined based on any or all of: information of a set of dynamic objects proximal to the agent including their current position, size, previous path, and predicted path into the future; information of a set of static objects proximal to the agent and their current states; a map (e.g., a high-definition map, a high-definition hand-labeled map, etc.); routing information required to reach the destination; the current ego state; and/or any other suitable information. Determining the environmental representation can optionally include determining a latent space representation, which can function to simplify the inputs, grant order invariance to the inputs, simplify processing of the inputs, and/or perform any other suitable functions.

Further additionally or alternatively, any other suitable inputs can be received in S210.

In a first set of variations, S210 includes receiving sensor information from a sensor system of the autonomous agent and a labeled map indicating a set of contexts assigned to a route (e.g., fixed route) and/or a potential route of the agent, wherein a context of the agent is determined based on the map and the sensor information. Any or all of the set of inputs (e.g., sensor information) are preferably received continuously throughout the method 200, but can additionally or alternatively be received at any other suitable times.

In a set of specific examples, the sensor information includes at least a location and/or orientation of the agent (e.g., a pose), information (e.g., location, orientation, motion, etc.) associated with dynamic and/or static objects in an environment of the agent, and optionally any other information, wherein the context of the agent is determined based on the location and/or orientation of the agent within the map.

In a second set of variations, additional or alternative to the first, S210 includes receiving sensor information from a sensor system of the autonomous agent and a context of the agent (e.g., a current context, an approaching context, etc.). The set of inputs are preferably received continuously throughout the method 200, but can additionally or alternatively be received at any other suitable times.

In a set of specific examples, the context is determined based on a map and a pose of agent, wherein the context is used subsequently in the method to select one of a $1^{st}$ set of learning modules.

4.2 Method—Determining a Set of Outputs S215

The method 200 includes determining a set of outputs S215, which functions to determine outputs with which to ultimately control the autonomous agent. Additionally or alternatively, S215 can function to select one or more learned models to implement; provide options for the trajectory implemented by the agent (e.g., learned vs. programmed vs. minimal risk, etc.); and/or perform any other suitable functions.

S215 is preferably performed multiple times throughout the method 200 to determine both intermediate outputs (e.g., action with which to select a deep trajectory network, multiple trajectory options, etc.) and one or more final outputs (e.g., a trajectory to be implemented by the controller), further preferably throughout each instance of the method 200 (e.g., at each planning cycle). Additionally or alternatively, S215 can be performed any or all of: continuously, at a predetermined frequency, at random intervals, prior to each of a set of processes of the method 200, and/or at any other suitable times. S215 can additionally or alternatively be performed in response to a trigger (e.g., determining an emergency planner output in response to uncertainty surpassing a threshold, etc.), at a set of intervals (e.g., random intervals), and/or at any other suitable time(s) during the method 200.

S215 and/or instances of S215 are preferably performed in response to S210, but can additionally or alternatively be performed prior to S210 (e.g., prior to an instance of S210); in response to the determination of one or more uncertainty values in S220; after another process of the method 200; prior to another process of the method 200; and/or at any other suitable times during the method 200.

S215 is preferably performed with a computing system of the system 100, further preferably with an onboard computing system implementing any or all of: a set of learned models, rule-based processes, programmed processes, and/or any other suitable processes.

S215 can optionally include determining (e.g., at each planning cycle, at each context transition, etc.) an output with one or more of the $1^{st}$ set of learned models (e.g., as described above). The output of the $1^{st}$ learned model(s) is preferably an action (equivalently referred to herein as a behavior) of the agent, but can additionally or alternatively include any other suitable outputs. S215 can optionally include selecting one of the $1^{st}$ set of learned models, wherein the particular model is selected based on environmental information of the agent, such as a particular context that the agent is currently located within. The model is preferably selected based on a predetermined assignment, such as a 1:1 assignment between context and the $1^{st}$ learned model, but can additionally or alternatively be otherwise selected.

Additionally or alternatively, an action of the autonomous agent can be determined with another suitable model and/or in any other suitable way; the $1^{st}$ set of learned models and the $2^{nd}$ set of learned models can be combined; S215 can be performed in absence of determining an action, and/or S215 can be otherwise performed.

S215 preferably additionally or alternatively includes determining (e.g., at each planning cycle, after each processing of a $1^{st}$ learned model, etc.) an output with one or more of the $2^{nd}$ set of learned models (e.g., as described above). The output of the $2^{nd}$ learned model(s) is preferably a trajectory for the agent, equivalently referred to herein as a learned trajectory, wherein the learned trajectory serves as a candidate for the vehicle's final trajectory, wherein the final trajectory is determined upon evaluating one or more uncertainty values as described below. Additionally or alternatively, the $2^{nd}$ learned model(s) can include any other suitable outputs. S215 can optionally include selecting one of the $2^{nd}$ set of learned models, wherein the particular model is selected based on output of the $1^{st}$ learned model, such as a particular action that the agent is to perform. The model is preferably selected based on a predetermined assignment, such as a 1:1 assignment between action and the $2^{nd}$ learned model, but can additionally or alternatively be otherwise selected.

Each of the $1^{st}$ set of learned models and the $2^{nd}$ set of learned models preferably receive an environmental representation of the agent (e.g., a full environmental representation, a localized environmental representation, etc.) as an input, wherein an output of the learned model is further determined based on this environmental representation. In preferred variations, the $1^{st}$ learned model receives a full environmental representation as an input, and the localized environmental representation receives a localized environmental representation as an input, wherein the localized environmental representation is determined based on (takes into account) a selected action for the agent. Additionally or alternatively, the learned models can receive the same environmental representation as input, otherwise different environmental representations, and/or any other suitable inputs.

Additionally or alternatively, a learned trajectory of the autonomous agent can be determined with another suitable model and/or in any other suitable way; S215 can be performed in absence of determining a learned trajectory, and/or S215 can be otherwise performed.

S215 preferably additionally includes determining a fallback trajectory with a fallback motion planner (e.g., as described above), wherein the system (e.g., the agent, a computing system of the agent, etc.) can select the fallback trajectory over the learned trajectory in an event that an uncertainty (e.g., as described below) associated with the learned trajectory is too high (e.g., in comparison with a set of thresholds, in comparison with a set of constraints and/or rules, etc.). Additionally or alternatively, the fallback trajectory can be selected for any other suitable reasons, selected over other trajectories, selected in absence of the determination of a learned trajectory (e.g., selected in response to an uncertainty of an output determined prior to the learned trajectory, selected in response to an uncertainty in an input, etc.), and/or otherwise implemented.

A fallback trajectory is preferably determined at each instance of the method 200, further preferably at each planning cycle of the autonomous agent. Additionally or alternatively, a fallback trajectory can be determined at any or all of: multiple times throughout the method, continuously, at a predetermined frequency (e.g., corresponding to the planning cycle frequency, independent of the planning cycle frequency, higher than the planning cycle frequency, lower than the planning cycle frequency, etc.); at a set of intervals (e.g., predetermined intervals, random intervals, etc.); and/or at any other suitable time(s). Further additionally or alternatively, the any or all instances of the method 200 can be performed in absence of determining a fallback trajectory.

In preferred variations, for instance, a fallback trajectory is determined each time a learned trajectory is determined for the agent (e.g., determined in parallel, determined concurrently with the learned trajectory, determined in response to the learned trajectory, determined prior to the learned trajectory, etc.), which functions to enable the fallback trajectory to be quickly implemented in case the uncertainty of the learned trajectory is too high (e.g., aleatoric uncertainty exceeds a threshold, epistemic uncertainty exceeds a threshold, total variance including both aleatoric and epistemic uncertainties exceeds a threshold, etc.). Additionally or alternatively, a fallback trajectory can be determined only if needed, wherein the fallback motion planner is triggered, for instance, in response to determining that the uncertainty of the learned trajectory (and/or any other uncertainty) is too high. Additionally or alternatively, the fallback trajectory can be implemented in absence of and/or prior to a learned trajectory, such as in an event that an uncertainty of an input and/or an output determined prior to the learned trajectory (e.g., an action, context, the set of inputs, etc.) is found to have too high of an uncertainty. Further additionally or alternatively, the fallback trajectory can be otherwise produced and/or triggered.

The fallback motion planner preferably receives information (e.g., as described above in S210) on the complete state of the environment (e.g., an environmental representation, a full environmental representation, etc.) as well as the goals of the agent (e.g., destination, fixed route, etc.). The motion planner further preferably takes input from a variety of modules including, but not limited to any or all of: mapping, localization, perception, prediction, and routing. In preferred variations, a mapping module provides background environmental information such as road lane-level information and traffic signals (e.g., in the form of vector maps); a localization module precisely tracks the state of the ego vehicle including position, heading, and velocity; a perception and prediction module handles dynamic obstacles by both detecting them and projecting their likely trajectories into the near future; and a routing module provides the ego vehicle goals in terms of source, destination, and waypoints. Additionally or alternatively, the motion planner can receive any other suitable information, any other components (e.g., $1^{st}$ set of learned models, $2^{nd}$ set of learned models, emergency planner, etc.) and/or processes of the method can receive these inputs, and/or the method can be otherwise performed.

The fallback motion planner is preferably a classical motion planner, wherein the classical motion planner functions to solve the complex task of decision-making with one or more programmed and/or probabilistic and/or rule-based approaches. This is a complex task, because the fallback motion planner must consider several sources of uncertainty, such as any or all of: the temporal evolution of situations, which cannot be predicted without uncertainty because other road users behave stochastically and their goals and plans cannot be measured and the ego vehicle's ability to only perceive a subset of the current situation with its sensors because measurements are noisy and because most of the environment is occluded. As such, the classical motion planner preferably employs a probabilistic approach, which functions to consider both forms of this described uncertainty.

In preferred variations, the fallback motion planner implements a transition model, preferably in the form of a Bayesian network, but additionally or alternatively including any other probabilistic approach, wherein the transition model formulates the task of driving as a continuous Partially Observable Markov Decision Process (POMDP) that can be automatically optimized for different scenarios. The POMDP representation is preferably used in association with a conservative implementation for the fallback motion planner, wherein the planner can estimate the motion intent of other dynamic objects (e.g., other vehicles and/or road uses) and associate high belief that the intentions are likely aggressive rather than defensive. Additionally or alternatively, the classical motion planner can include any other models and/or programmed approaches, such as, but not limited to, any or all of: policy gradient methods, finite state machines [FSMs], rule-based decision trees, other probabilistic methods, imitation learning [IRL], RL, or variations of IRL, and/or any other suitable models and/or networks and/or algorithms.

In a specific example or rerouting due to a construction zone (e.g., as shown in FIGS. 9A-9C), as the ego vehicle approaches the intersection, it detects the nominal road context of a multi-lane road becoming a single lane road and a suspected motion intention for the obstacle vehicle. As illustrated in 9A, the ego vehicle triggers a "decelerate" mode first to avoid the potential collision with the approaching vehicle in the neighboring lane, which was associated with a high belief that it will continue its current "normal" behavior to an "accelerate" behavior. After some time, the obstacle vehicle, however, changed its behavior and decided to give way to the ego vehicle, as in FIG. 15B, where its motion intention belief was updated accordingly. Given the increasing confidence that the obstacle vehicle may want to let the ego vehicle pass, as seen in FIG. 15B, the ego vehicle decides to accelerate and cautiously starts proceeding in the desired lane with a low belief that the obstacle vehicle will continue its current "normal" behavior to decelerate. However, at this point, the obstacle vehicle again changes and has now decided to accelerate and overtake the ego vehicle as seen in FIG. 9C, where its motion intention belief is updated to represent the increasing confidence that the obstacle vehicle will keep its behavior to accelerate. As such, the ego vehicle triggers the decelerate mode and allows the obstacle vehicle to pass. In this case, rather than over-conservative behavior of waiting forever or too aggressive behavior of claiming the right-of-way, the ego vehicle is able to properly reason the obstacle vehicle's intention and react in a deterministic manner.

Additionally or alternatively, the fallback motion planner can otherwise operate, plan trajectories, and/or otherwise adapt trajectories for the autonomous agent.

S215 can additionally or alternatively include determining one or more outputs with an emergency planner, wherein the emergency planner functions to enforce recovery behavior. The output of the emergency planner is preferably a trajectory, wherein the emergency planner is further preferably triggered (e.g., as described below) in an event that neither the learned trajectory nor the fallback trajectory can be trusted (e.g., neither satisfies a set of constraints, rules, and/or criteria; a feasible trajectory set at the gatekeeper is empty (e.g., based on an uncertainty of one or more programmed trajectories exceeding a threshold); one or more uncertainty values is above a predetermined threshold; one or more uncertainty values is above an extreme upper threshold; etc.). Additionally or alternatively, the emergency planner can be triggered earlier in the method (e.g., prior to a learned trajectory being determined, prior to a fallback trajectory being determined, etc.) and/or at any other suitable time(s).

Additionally or alternatively, an output of the emergency planner can include an action (e.g., immediate stop, turning on of vehicle's hazard lights, etc.) of the vehicle and/or any other suitable output(s). The emergency planner can be any or all of: part of the fallback motion planner, independent from (e.g., separate and distinct from, in communication with, not in communication with, etc.) the fallback motion planner, and/or any combination.

S215 can additionally or alternatively include producing any other outputs, such as any or all of the intermediate outputs used to ultimately determine a trajectory, such as, but not limited to: a vehicle context, an environmental representation (e.g., as described above), a latent space representation (e.g., as described above), and/or any other suitable outputs. Additionally or alternatively, S215 can include producing outputs from any or all of the agent's modules (e.g., planning, perception, localization, etc.) and/or any other suitable outputs.

In a first set of variations, S215 includes optionally determining an action with a $1^{st}$ learned model; determining a learned trajectory with a $2^{nd}$ learned model; determining a fallback trajectory with a fallback motion planner (e.g., wherein the learned trajectory and the fallback trajectory are passed through a gatekeeper); and optionally determining a recovery behavior and/or recovery trajectory with an emergency planner (e.g., in an event that neither of the learned and fallback trajectories are deemed acceptable, to have as backup, etc.).

In a specific example, S215 includes optionally receiving and/or determining a context based on a map; optionally selecting a single $1^{st}$ learned model from a $1^{st}$ set of multiple learned models (e.g., based on a 1:1 mapping from context to a $1^{st}$ learned model); optionally determining an action for the vehicle with the $1^{st}$ learned model; optionally selecting a $2^{nd}$ learned model from a $2^{nd}$ set of multiple learned models; determining a learned trajectory with the $2^{nd}$ learned model; determining a programmed fallback trajectory with a classical motion planner; and optionally determining a recovery behavior and/or trajectory for the agent.

In a second set of variations, S215 includes determining a learned trajectory with a learned model; determining a fallback trajectory with a fallback motion planner (e.g., wherein the learned trajectory and the fallback trajectory are passed through a gatekeeper); and optionally determining a recovery behavior and/or recovery trajectory with an emergency planner (e.g., in an event that neither of the learned and fallback trajectories are deemed acceptable, to have as backup, etc.).

In a specific example, S215 includes optionally receiving and/or determining a context based on a map; optionally selecting a learned model from a set of multiple learned models (e.g., based on a 1:1 mapping from context to a learned model); determining a learned trajectory with the learned model; determining a programmed fallback trajectory with a classical motion planner; and optionally determining a recovery behavior and/or trajectory for the agent.

In a third set of variations, S215 includes optionally determining an action with a $1^{st}$ learned model; determining a learned trajectory with a $2^{nd}$ learned model; optionally determining a fallback trajectory with a fallback motion planner (e.g., wherein the fallback trajectory is prompted in response to the learned trajectory not being validated); and optionally determining a recovery behavior and/or recovery trajectory with an emergency planner (e.g., in an event that neither of the learned and fallback trajectories are deemed acceptable, to have as backup, etc.).

Additionally or alternatively, S215 can include any other suitable processes.

4.3 Method—Determining a Set of Uncertainty Values Associated With the Set of Inputs and/or the Set of Outputs S220

The method 200 includes determining a set of uncertainty values associated with the set of inputs and/or the set of outputs S220, which can function to determine any or all of: whether any or all of a set of inputs (e.g., as received in S210, as received at any or all of a set of modules, etc.) correspond to out-of-distribution data; the uncertainty associated with any or all of a set of outputs; an aggregated uncertainty (e.g., among different uncertainty types, for a sequential series of outputs, etc.); and/or S220 can function to determine any other suitable information. S220 can additionally or alternatively function to trigger one or more processes of the method such as one or more actions in S230; skip one or more processes of the method (e.g., in an event that an uncertainty of an output is above a threshold); and/or can perform any other suitable functions.

S220 is preferably performed multiple times throughout the method, such as at any or all of the following times: in response to receiving a set of inputs (e.g., any time S210 is performed, any time an environmental representation is determined, etc.); in response to determining an output with a learned model (e.g., a $1^{st}$ learned model, a $2^{nd}$ learned model, etc.); in response to determining an output and/or an intermediate output at any module of the agent; in response to a trigger; and/or at any other time(s) and in response to any suitable processes. Additionally or alternatively, any or all of S220 can be performed any or all of: once, continuously, at a predetermined frequency, In preferred variations, S220 is performed in response to S210 (e.g., determining a full environmental representation) and at least in response to the determination of each of a set of learned models (e.g., $1^{st}$ learned model, $2^{nd}$ learned model, etc.) involved in determining a learned trajectory for the agent. Additionally or alternatively, S220 can be performed at the processing of any module of the agent (e.g., perception module, prediction module, localization module, planning module, routing module, etc.), at a subset of these time(s), and/or at any other suitable times.

S220 is preferably performed by a computing system of the system, further preferably an onboard computing system, but can additionally or alternatively be performed by multiple computing systems, by a remote computing system, and/or by any other components and/or systems.

The uncertainty values can be associated with any or all of the set of inputs, any or all of the set of outputs, and/or any combination of the inputs and outputs. For uncertainty values associated with a set of outputs, the uncertainty values preferably accompany the outputs throughout the method (and optionally aggregated) such that the various contributions to uncertainty can be determined and used in decision making. Additionally or alternatively, uncertainty values can be individually checked and/or evaluated each time they are determined and/or any combination of being carried through the method with their associated outputs and individually checked.

S220 preferably includes determining the uncertainty associated with one or more outputs produced during the method 200 and/or received at the method 200. In preferred variations, this includes at least the learned trajectory of the agent, and also preferably an action determined for the agent (e.g., an output of the $1^{st}$ learned model). Additionally or alternatively, uncertainties can be determined for any or all of the set of inputs, a context determined for the agent (e.g., based on a map), and/or any other suitable inputs and outputs.

Figure 5:
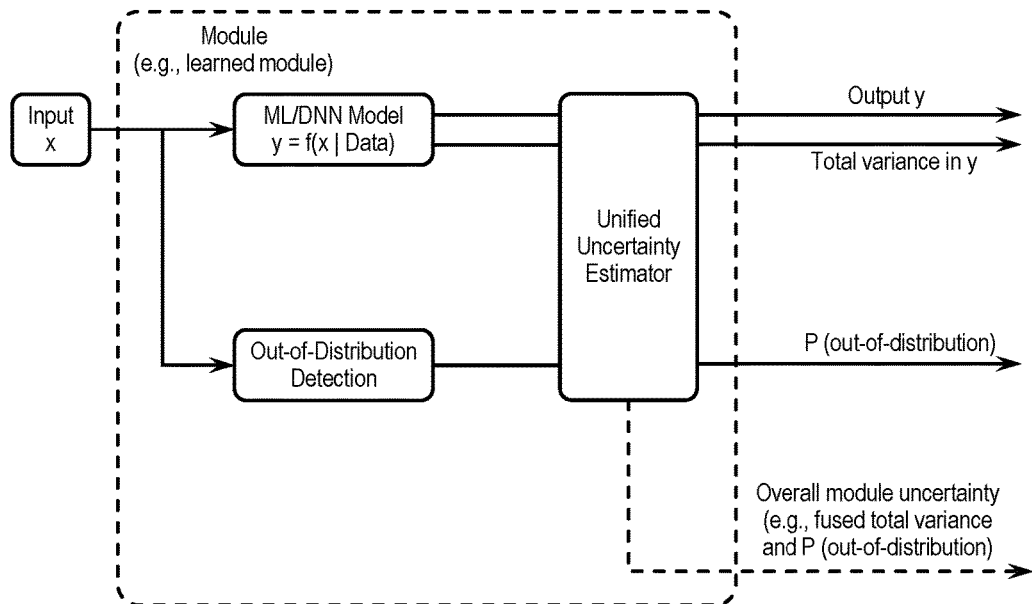
FIG. 5 depicts a schematic variation of an uncertainty estimation architecture for each of a set of modules (e.g., perception module, localization module, $1^{st}$ set of learning modules, $2^{nd}$ set of learning modules, etc.).

In a preferred set of variations, a set of one or more uncertainty values is determined at each of a set of modules (e.g., as shown in FIG. 5), wherein the set of modules includes at least the learned models (referred to as micromodules within the planning module) used for context-aware decision making and generation of the learned trajectory for the vehicle. Additionally, an uncertainty can be determined for any or all of the other modules (e.g., implementing learned models, implemented programmed processes, etc.) in the agent (e.g., perception module, prediction module, localization module, etc.). The uncertainty values are preferably produced as an output of a learned model of a module (e.g., trained as an output, trained as an additional regression output, etc.), but can additionally or alternatively be produced with one or more algorithms, models (e.g., a separate learned model), and/or equations. In specific examples, uncertainty values are determined at both a $1^{st}$ learned model, which determines a specific action of the agent (e.g., through a 1:1 mapping between a vehicle context and a $1^{st}$ learning module), and at a $2^{nd}$ learned model, which determines a learned trajectory of the agent (e.g., through a 1:1 mapping between a vehicle action and a $2^{nd}$ learning module). Additionally or alternatively, uncertainty estimates can be determined at any suitable times and in association with any suitable components of the system and/or processes of the method.

The set of uncertainty values preferably includes an aleatoric uncertainty (e.g., an estimated aleatoric uncertainty, an estimated aleatoric uncertainty produced as a model output, etc.), which can function to enable the system to report known unknowns. Additionally or alternatively, the aleatoric uncertainty can capture the noise inherent in observations In a specific example, for instance, if the training data used to train one or more learned models and/or modules (e.g., $1^{st}$ set of learned models, $2^{nd}$ set of learned models, etc.) includes foggy images and the system is performing well, the height might be reported with a very accurate error margin, allowing a fallback to be triggered in S230 (e.g., a deterministic trajectory to be selected and implemented).

The set of uncertainty values further preferably includes an epistemic uncertainty (e.g., an estimated epistemic uncertainty, an estimated epistemic uncertainty produced as a model output, etc.), which functions to enable the system to self-report a confidence in the convergence of its result. Additionally or alternatively, the epistemic uncertainty can function to account for uncertainty in the model itself, essentially capturing an ignorance of the selection of one or more models as the best model to explain the data.

Figure 8:
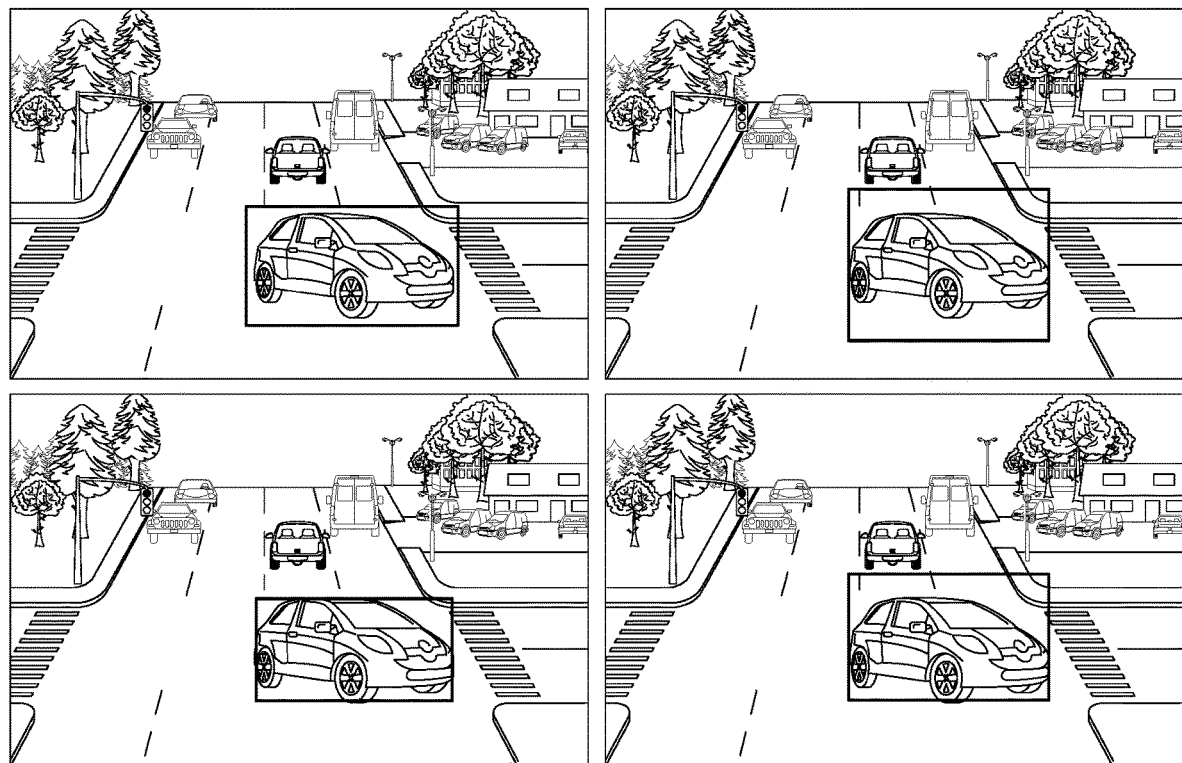
FIG. 8 depicts different heights of bounding boxes reported for the same input frame from a camera (e.g., front telephoto camera) on a route indicating higher epistemic certainty.
Figure 11:
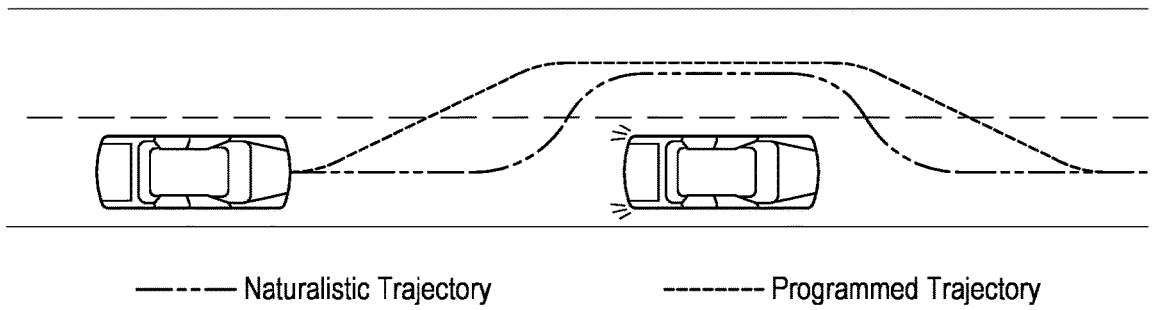
FIG. 11 depicts a naturalistic trajectory versus a programmed trajectory.
Figure 12:
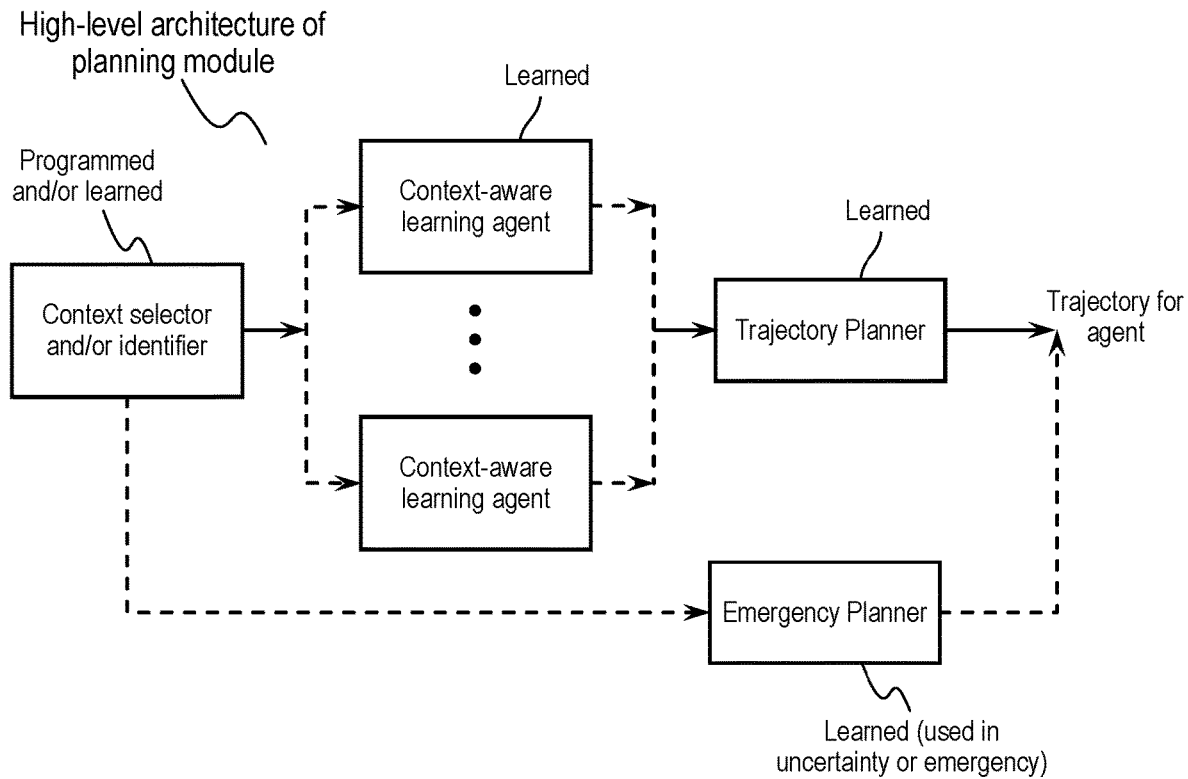
FIG. 12 depicts a high-level architecture of a planning module including an emergency planner.
Figure 13:
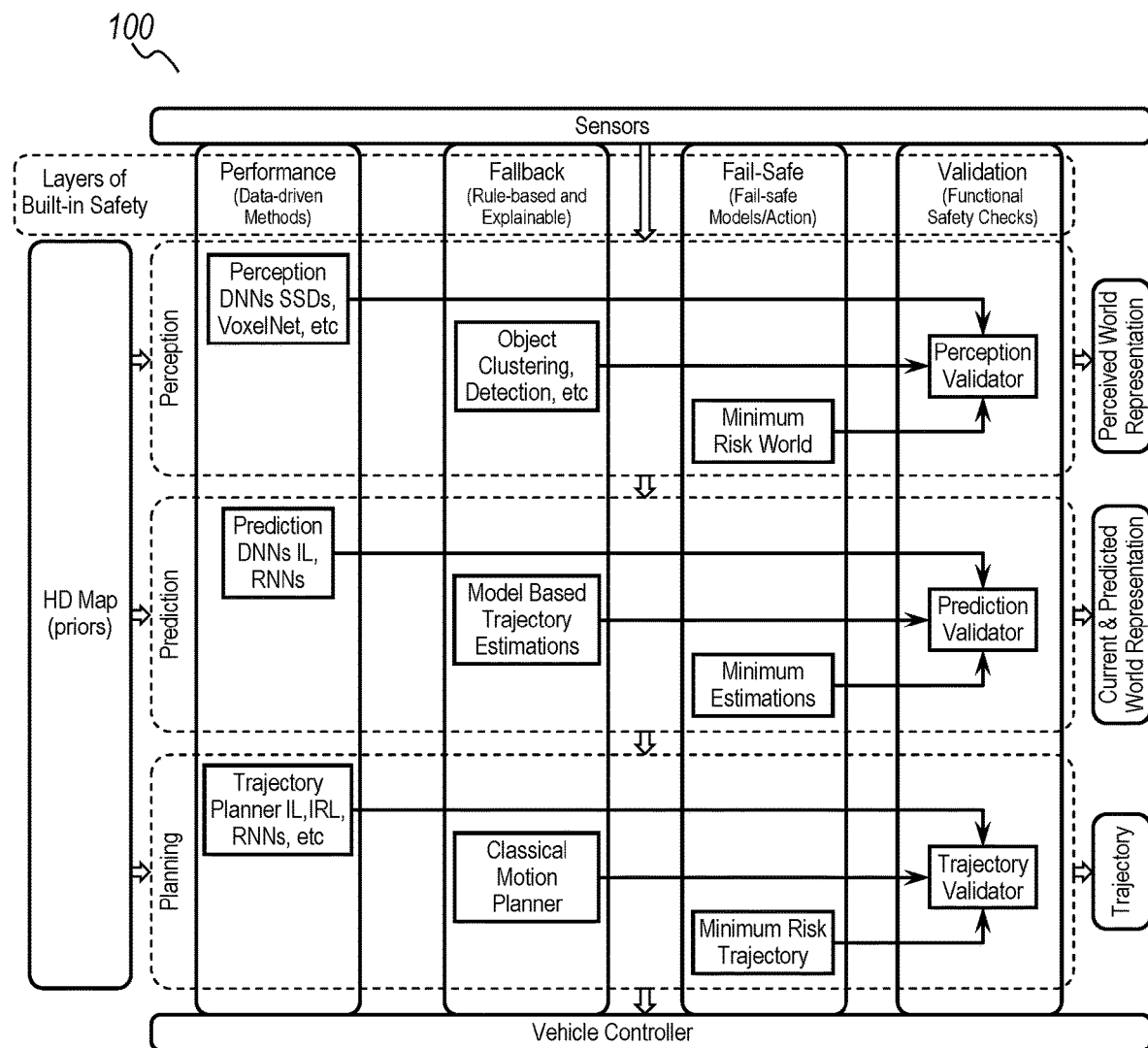
FIG. 13 depicts a schematic variation of the system.

In some variations (e.g., as shown in FIG. 8), for instance, different heights of bounding boxes reported for the same input frame from a front telephoto camera on a route can indicate a relatively high epistemic uncertainty, which can function to trigger a fallback in S230. In a specific example, from 5 MonteCarlo runs, the system could assign a detected neighboring vehicle bounding box height estimates of 5 meters (m), 1 m, 2 m, 3 m, and 4 m. This indicates more uncertainty than if the provided estimates were 3 m, 3 m, 3 m, 3 m, and 3 m. If the learned model is not self-consistent, then it could be desirable to trigger a fallback.

In preferred variations, each of the learned models is designed to support a state-of-the-art approach for uncertainty estimation in deep networks, to enable estimation of both aleatoric and epistemic uncertainty to provide an overall predictive variance that can accompany the module's output to the destination consumer. The consumer can then make an educated decision in S230, such as having the planner expand the bounding box of a vehicle with an uncertain decision. The output uncertainties can optionally be fused with an input uncertainty (e.g., as described below with an out-of-distribution detector) to evaluate a larger overall uncertainty for the module and trigger a fallback scenario.

The set of uncertainty values can additionally or alternatively include any other statistical uncertainty values and/or any other uncertainty values.

S220 can optionally include aggregating (e.g., fusing, combining, adding, multiplicatively combining, adding in a weighted fashion, etc.) any or all of the uncertainty values.

Aggregating the set of uncertainty values can optionally include determining an overall uncertainty, preferably an overall predictive variance, such as for each module/model (overall module uncertainty), which functions to combine multiple types of uncertainty associated with the module/model. This preferably includes fusing different types of uncertainties (e.g., epistemic and aleatoric), but can additionally or alternatively include fusing any other uncertainties. Additionally or alternatively, the overall uncertainty can include any other overall uncertainty.

In preferred variations, an overall predictive variance (equivalently referred to herein as a total variance) is determined for each module/model (e.g., the $1^{st}$ learned model, the $2^{nd}$ learned model, the planning module, the perception module, etc.), such as shown in FIG. 5, which combines (e.g., fuses, adds, etc.) epistemic and aleatoric uncertainties to provide a joint estimate of the total predictive uncertainty associated with the module, which accompanies the module's output to the next recipient of the method. In specific variations, for instance, the recipient (e.g., a subsequent model/module) can then make an educated decision based on the uncertainty. In specific examples, for instance, the planner can expand the bounding box of a detected vehicle in response to receiving an uncertainty from a previous module above a predetermined threshold. Additionally or alternatively, the uncertainty for the module can trigger a fallback scenario and/or trigger any other process in S230 and/or be otherwise implemented and/or used.

Aggregating the set of uncertainty values can additionally or alternatively include combining uncertainty values from previous modules/models, which functions to take into account the uncertainties accumulated throughout the method (e.g., from different data sources, associated with different outputs, determined from different modules/models, etc.). The uncertainty values from different modules/models are preferably aggregated through multiplication to determine a multiplicative uncertainty, but can additionally or alternatively be added (e.g., in a weighted fashion, with an algorithm, with a model, etc.) and/or otherwise combined. The individual uncertainty values can be aggregated together (e.g., epistemic uncertainty values aggregated, aleatoric uncertainty values aggregated together, etc.), an overall uncertainty value can be aggregated with other overall uncertainty values (e.g., overall predictive variance values aggregated together), and/or uncertainty values can be otherwise suitably aggregated. Additionally or alternatively, uncertainty values can be otherwise combined.

In a first set of variations implementing modular decision-making (e.g., $1^{st}$ set of learning models, etc.) and a learned trajectory generation module (e.g., $2^{nd}$ set of learning models, etc.), multiplicative uncertainty from previous individual modules (e.g., perception module, prediction module, localization module, etc.) along with a current uncertainty estimate from the context-aware learned driving policy model can be used to establish an overall confidence in the output of the data-driven models. This uncertainty can optionally be used at several checkpoints throughout the system stack, but is preferably used at least to select between the trajectories provided by the data-driven context-aware driving policy module or a fallback classical motion planner (e.g., as described in S230). Additionally or alternatively, the uncertainties from previous modules can be otherwise used.

S220 preferably includes determining one or more uncertainties associated with a set of inputs received during the method 200 (e.g., in S210), wherein the uncertainty associated with an input functions to indicate to what degree the input data being used for decision making and/or trajectory generation is in-distribution (or out-of-distribution) with the data used to train one or more models in the method.

The uncertainty of the inputs is preferably determined with an out-of-distribution detector, which functions to calculate a probability that the input data is out-of-distribution with respect to the training data. The uncertainty in these variations is preferably in the form of this probability of being out-of-distribution (P[out-of-distribution]), but can additionally or alternatively include any other probability parameter (e.g., probability of data being in-distribution) and/or uncertainty parameter.

The out-of-distribution detector preferably implements an algorithm that is designed and trained specifically to overfit to (e.g., be trained based on data from the fixed route itself) a fixed-route use-case of the system and method, wherein the agent travels (e.g., only travels, primarily travels, etc.) on one or more predetermined fixed routes between a starting point and a destination. This provides a strong prior with which to compare test data during operation of the agent, and enables the identification of instances during actual deployment where the live input data was not well represented in the training set and hence the output of the learned methods is undefined. In such instances, the system can then, for instance, in S230 function to fall back to a highly conservative classical motion planner or trigger emergency recovery behavior as the learned method's undefined behavior makes it untrustworthy.

The out-of-distribution detector is preferably used at least with the planning module, further preferably with the subsystem for context-aware decision making and trajectory generation (e.g., the $1^{st}$ learned model and the $2^{nd}$ learned model), such as that shown in FIGS. 3A-3D. In specific examples, the subsystem for context-aware decision making and trajectory generation can include any or all of the systems, components, processes, embodiments, and/or examples described in U.S. application Ser. No. 17/125,668, filed 17 Dec. 2020, which is incorporated herein in its entirety by this reference. Additionally or alternatively, the out-of-distribution detector can be applied to other planning modules (e.g., perception, prediction, localization, etc.), to each of the $1^{st}$ set and $2^{nd}$ set of learned models individually, and/or to any other modules/models.

The specific algorithm used for out-of-distribution detection can optionally depend on the input type (e.g., point cloud data vs. image data vs. ego pose information), which can be determined, for instance, based on the particular module that the out-of-distribution detector is working with. The out-of-distribution detection preferably uses variational autoencoders and/or density estimation methods, but can additionally or alternatively include any other models, algorithms, equations, decision trees, and/or any other suitable tools. This approach can be applied to multiple processes throughout the method, such as to select between trajectories provided by data-driven context-aware driving policy modules and/or a fallback classical motion planner.

The out-of-distribution detector is further preferably trained with unsupervised learning, which functions to account for the limitation (e.g., impossibility, difficulty, etc.) of fully representing unknown unknowns via labelled examples, but can additionally or alternatively be trained with supervised learning, a combination of both, and/or based on any other training processes.

Figure 6:
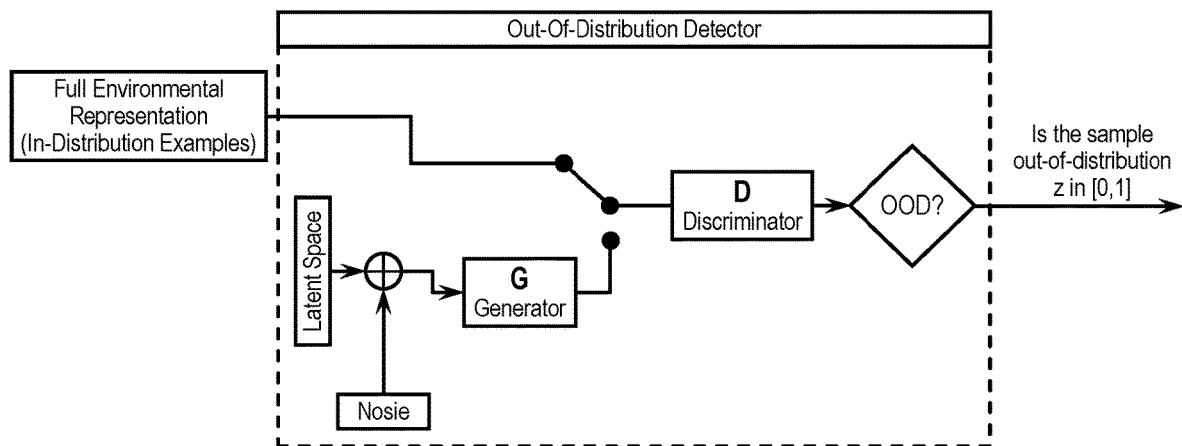
FIG. 6 depicts a schematic variation of an out-of-distribution detector training using a generative adversarial network (GAN).

In preferred variations, the out-of-distribution detector preferably includes an algorithm based on generative adversarial networks (GANs) (e.g., as shown in FIG. 6) trained on "normal" data (in-distribution examples) via unsupervised learning, which enables performance of out-of-distribution detection. The GANs are preferably configured to provide significant amounts of in-distribution examples with low variability within this distribution that allows straightforward overfitting to the specific routes and improves the detector's performance on out-of-distribution samples, which is enabled and/or supported based on applications involving repeated fixed routes for the agent. Additionally or alternatively, the out-of-distribution detector can include any other algorithms and/or models trained in any suitable way and/or for any suitable use cases (e.g., non-fixed/dynamically determined routes). Further additionally or alternatively, the out-of-distribution detector can use any other architectures, such as but not limited to, any or all of: statistical profiling processes (e.g., using histograms, state vector machines, nearest-neighbor based processes, etc.), other architectures for anomaly detection, other adversarially learned processes, and/or any other suitable processes and/or tools.

Figure 3A:
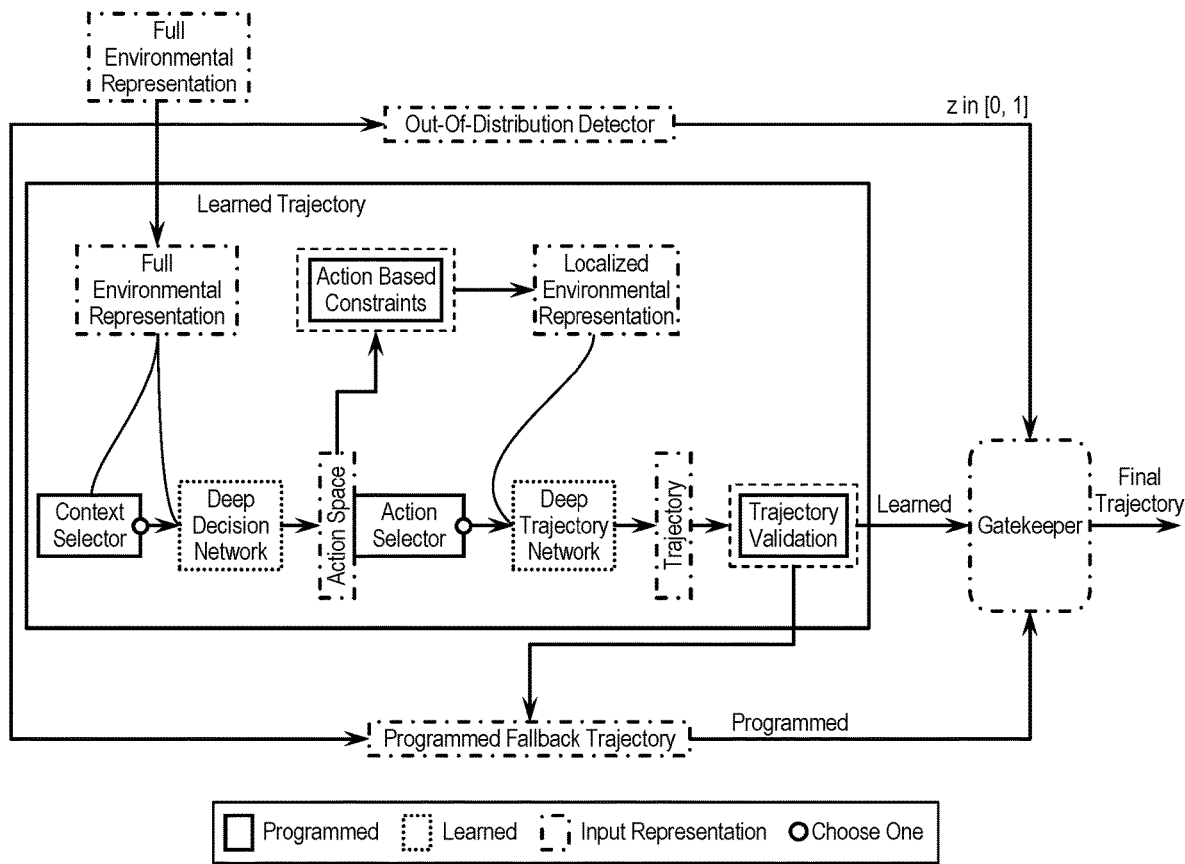
FIGS. 3A-3D depicts a schematic variation of a system for decision-making and trajectory generation.
Figure 3B:
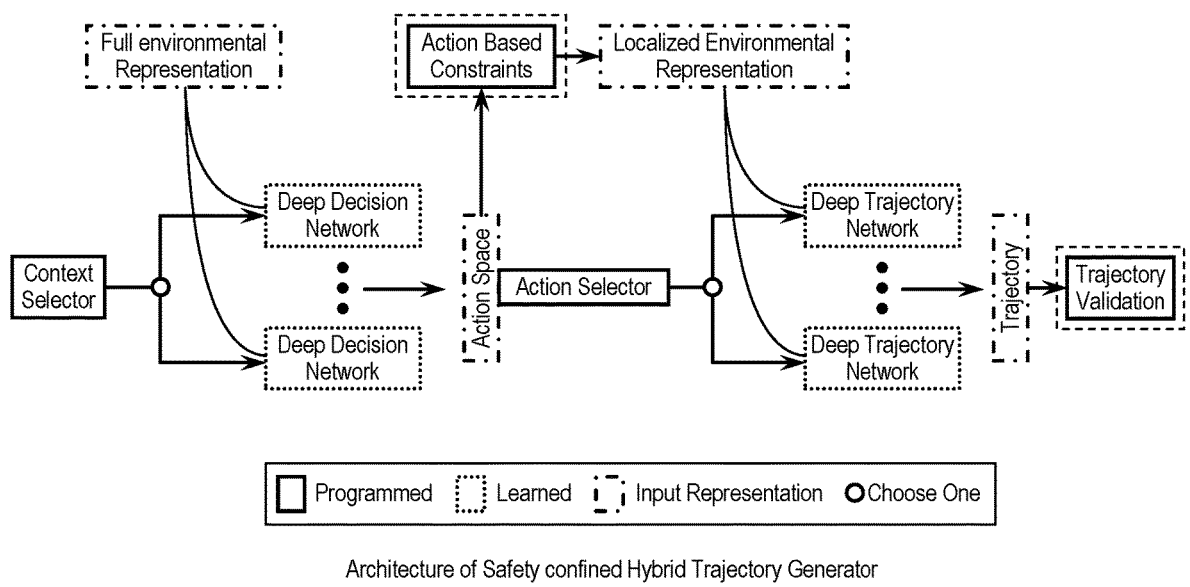
Figure 3C:
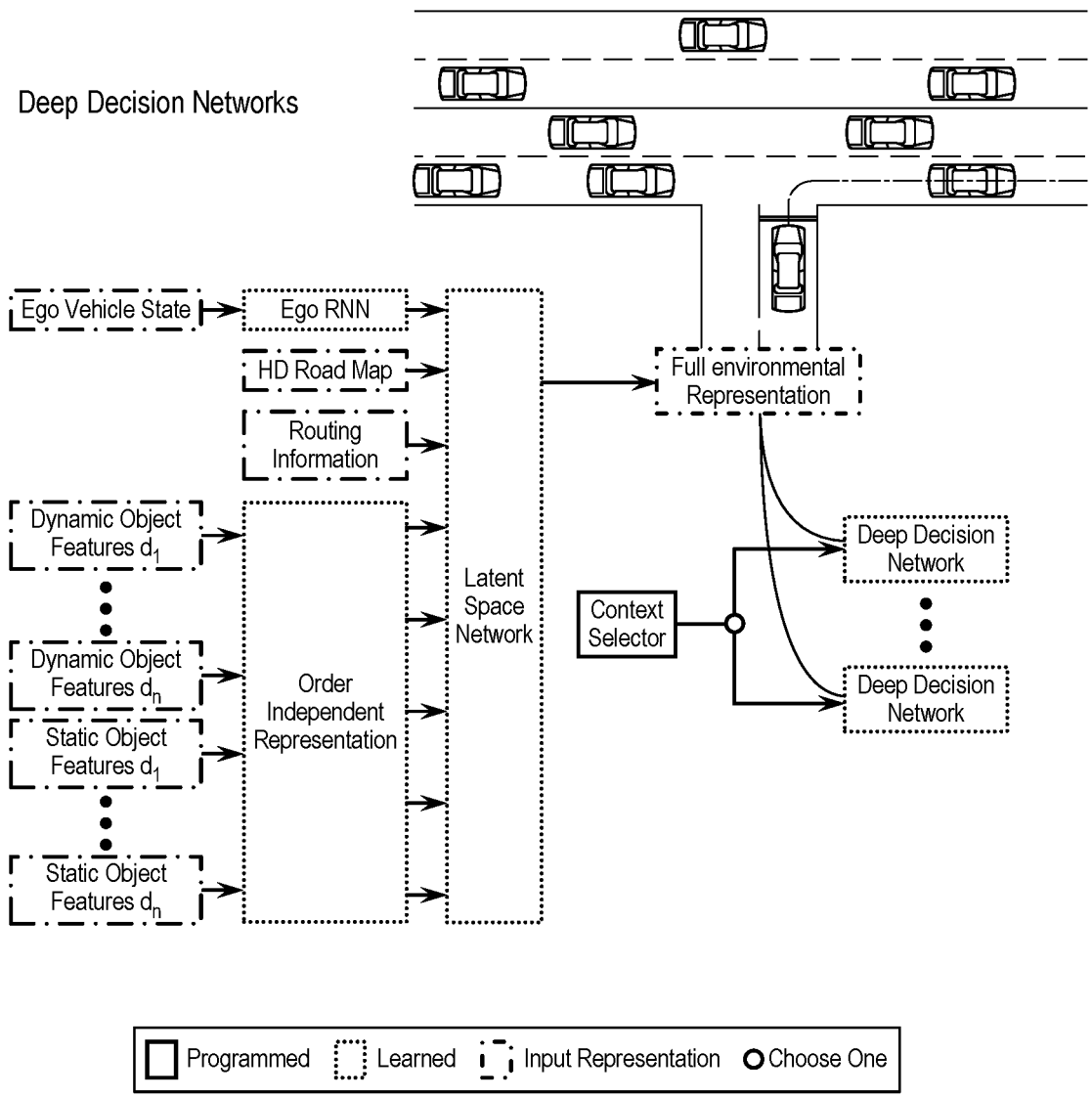
Figure 3D:
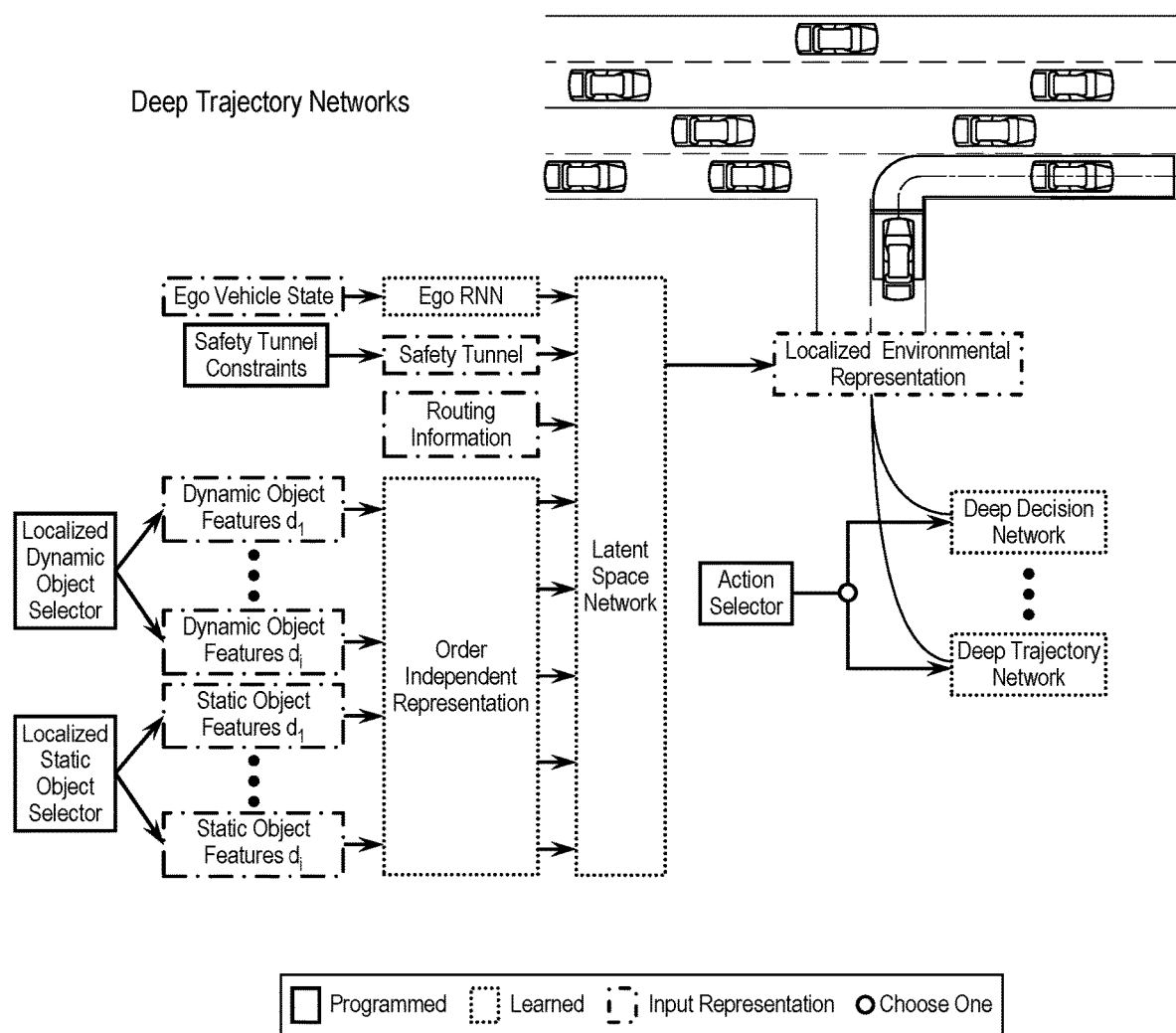

The out-of-distribution detector preferably uses and/or interfaces with an environmental representation of the set of inputs (e.g., as described above, full environmental representation, etc.), further preferably a latent space representation of the environmental representation, but can additionally or alternatively be implemented in absence of a latent space representation and/or with any or all of the set of inputs. In preferred variations (e.g., as shown in FIG. 3A), the out-of-distribution detector, the module for determining a learned trajectory, and the fallback motion planner all receive an environmental representation (e.g., the same environmental representation, the full environmental representation, etc.).

In a set of specific examples, the out-of-distribution detector includes a GAN trained on in-distribution examples (e.g., usual driving scenarios encountered on a fixed route), which capture normal variability of training data, and a subsequent encoder training approach, which enables fast mapping from a full environment representation input to corresponding locations of the learned latent space representation. During detection, the latent space location for given query input data is determined through performing iterative backpropagation leading to an uncertainty score by using the previously trained generator and discriminator.

Figure 7:
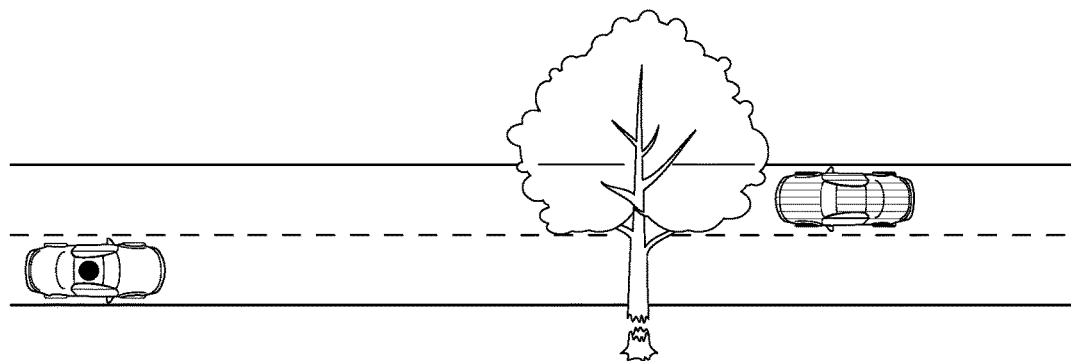
FIG. 7 depicts an example of out-of-distribution data representing a tree falling in the road.

In an example of use of the out-of-distribution detector, the case of a fallen tree (e.g., as shown in FIG. 7), can represent a situation not included in a training data set of usual driving scenarios which were captured during data collection for training one or more models (e.g., collected on a fixed route). This therefore becomes an anomaly (out-of-distribution sample) for the decision-making module. As the data-driven models were never trained on an input like this, there is no guarantee on the output produced by them, and the output is essentially undefined. In this example, even if perfect performance of all elements upstream from the planning module is assumed, as a learned trajectory generator was never trained for this specific situation, the agent is at risk of crashing into the tree without any warning. With an out-of-distribution detector as described above (e.g., a GAN-based out-of-distribution detector), however, the fallen tree would likely have no content representation in the latent space and so in variations using a GAN, a discriminator of the GAN would have a salient feature (a high residual) that it uses to make the detection. With this approach, the GAN discriminator estimates a high enough probability of the input being outside of the training set and assigns a high uncertainty score to the output of the data-driven decision-making module that can trigger a process in subsequent process of the method, such as the use of a conventional programmed fallback system to generate a trajectory.

Any or all of the parameters (e.g., probability) determined by the out-of-distribution detector can optionally be aggregated (e.g., fused, added to, multiplicated with, combined in a weighted fashion, combined with a rule, etc.) with any or all of: each other (e.g., other probabilities from other modules), other uncertainty values (e.g., epistemic uncertainty, aleatoric uncertainty, etc.), and/or any other suitable information. Additionally or alternatively, the out-of-distribution detector parameters can remain independent from other values and/or be otherwise implemented.

Additionally or alternatively, S220 can include determining any other parameters associated with an uncertainty (e.g., low confidence, high variance, etc.) of any or all of the inputs and/or outputs received and/or produced during and/or prior to the method 200.

In a first set of variations, S220 includes: determining a probability that input data is out-of-distribution with an out-of-distribution detector; determining a set of uncertainty values associated with a learned trajectory produced with one or more learned models (e.g., $2^{nd}$ learned model, $2^{nd}$ learned model and $1^{st}$ learned model, etc.); optionally determining a set of uncertainty values associated with an intermediate output (e.g., action) used to determine the learned trajectory with a learned model (e.g., $1^{st}$ learned model); optionally determining uncertainty values associated with any other modules used during operation of the agent; and optionally aggregating any or all of the uncertainty parameters.

In a set of specific examples, S220 includes determining a probability that an environmental representation including information received by the agent is out-of-distribution with an out-of-distribution detector (e.g., GAN); determining an aleatoric and epistemic uncertainty value associated with each of the learned models (e.g., $1^{st}$ learned model and $2^{nd}$ learned model); fusing the aleatoric and epistemic uncertainty values to determine an overall predictive variance associated with each model; and aggregating the uncertainty values from multiple models (e.g., to determine a multiplicative uncertainty). Additionally or alternatively, the uncertainty from any other module and/or models can be determined (e.g., and aggregated).

In a second set of specific examples, S220 includes for each of a set fo models: determining a probability that an environmental representation including information received by the agent is out-of-distribution with an out-of-distribution detector (e.g., GAN); determining an aleatoric and epistemic uncertainty value associated with the learned model (e.g., $1^{st}$ learned model, $2^{nd}$ learned model); fusing the aleatoric and epistemic uncertainty values to determine an overall predictive variance associated with each model; and aggregating the uncertainty values from multiple models (e.g., to determine a multiplicative uncertainty). Additionally or alternatively, the uncertainty from any other module and/or models can be determined (e.g., and aggregated).

In a third set of specific examples, S220 includes determining a probability that an environmental representation including information received by the agent is out-of-distribution with an out-of-distribution detector (e.g., GAN); determining an aleatoric and epistemic uncertainty value associated with each of the learned models (e.g., $1^{st}$ learned model and $2^{nd}$ learned model); optionally fusing the aleatoric and epistemic uncertainty values to determine an overall predictive variance associated with each model; optionally aggregating the uncertainty values from multiple models (e.g., to determine a multiplicative uncertainty); aggregating the overall predictive variance and/or the multiplicative uncertainty with the output from the out-of-distribution detector; and optionally determining the uncertainty from any other module and/or models.

Additionally or alternatively, S220 can implement any other suitable processes for observing anomalies in input data and/or determining the uncertainty associated with a set of outputs.

4.4 Method—Evaluating a Set of Uncertainty Parameters and Optionally Triggering an Action/or Process S230

The method 200 includes evaluating a set of uncertainty parameters and optionally triggering an action and/or process S230, which functions to assess the confidence of any or all of: the set of inputs received in the method, the set of outputs produced by the method, any processes of the method, and/or any combination of parameters, and react accordingly. Additionally or alternatively, S230 can function to trigger one or more processes and/or components, select between multiple output options, trigger the skipping of one or more processes (e.g., to go straight to an emergency planner), alter the performance of one or more processes, ensure a safety of the system, enable the determination of a deterministic trajectory, and/or can perform any other suitable function(s).

S230 is preferably performed in response to S220, such as in response to any or all of: the determination of each uncertainty parameter and/or a subset of uncertainty parameters; the determination of a particular uncertainty parameter and/or associated model/module (e.g., uncertainties of $2^{nd}$ learned model, probability of out-of-distribution, etc.); the performance of any other processes of the method (e.g., the performance of a learned model and/or module); and/or at any other suitable time(s). S230 can be performed any or all of: multiple times throughout the method, a single time (e.g., at the gatekeeper), continuously, at a predetermined frequency, at a set of intervals (e.g., random intervals), in response to a trigger, and/or any other suitable times.

S230 is preferably performed with a computing system as described above, further preferably an onboard computing system, but can additionally or alternatively be performed with any other suitable component and/or systems.

S230 preferably includes evaluating any or all of the uncertainty values determined in S220, wherein evaluating one or more uncertainty values can include any or all of: comparing one or more values with a set of one or more thresholds (e.g., predetermined thresholds, dynamically determined thresholds, etc.); comparing one or more values with a set of rules and/or constraints (e.g., traffic rules, predetermined constraints for vehicle behavior such as a minimum braking distance, maximum acceleration and/or deceleration, maximum and/or minimum speed constraints, etc.), calculating other parameters with the uncertainty value (s) and an algorithm and/or model; and/or otherwise evaluating the value(s).

Evaluating the uncertainty values preferably functions to determine if the uncertainty is deemed too high (e.g., to be confident that the vehicle will react appropriately, to trust the outputs produced by the models, etc.), but can additionally or alternatively function to ensure that the agent obeys traffic laws; behaves in a way which is not surprising, inconvenient, and/or dangerous to other vehicles; and/or can perform any other functions.

In preferred variations, for instance, because driving is done in a multi-vehicle environment, pre-emptive safety is also important. Therefore, the ego vehicle must not brake suddenly or drive erratically (except to avoid a collision) so as not to cause confusion or anxiety to other drivers, which may lead to dangerous situations. Partly this is already encouraged by optimizing for a smooth trajectory; however adding hard constraints can ensure that the agent avoids these situations.

The uncertainty values can be evaluated any or all of: together (e.g., if aggregated), individually, and/or any combination of both.

S230 preferably includes checking for validation of a trajectory based on the uncertainty values and determining if a fallback trajectory from a fallback motion planner should be used, which functions to determine which trajectory an agent should follow and optionally if a fallback scenario is triggered.

Figure 16:
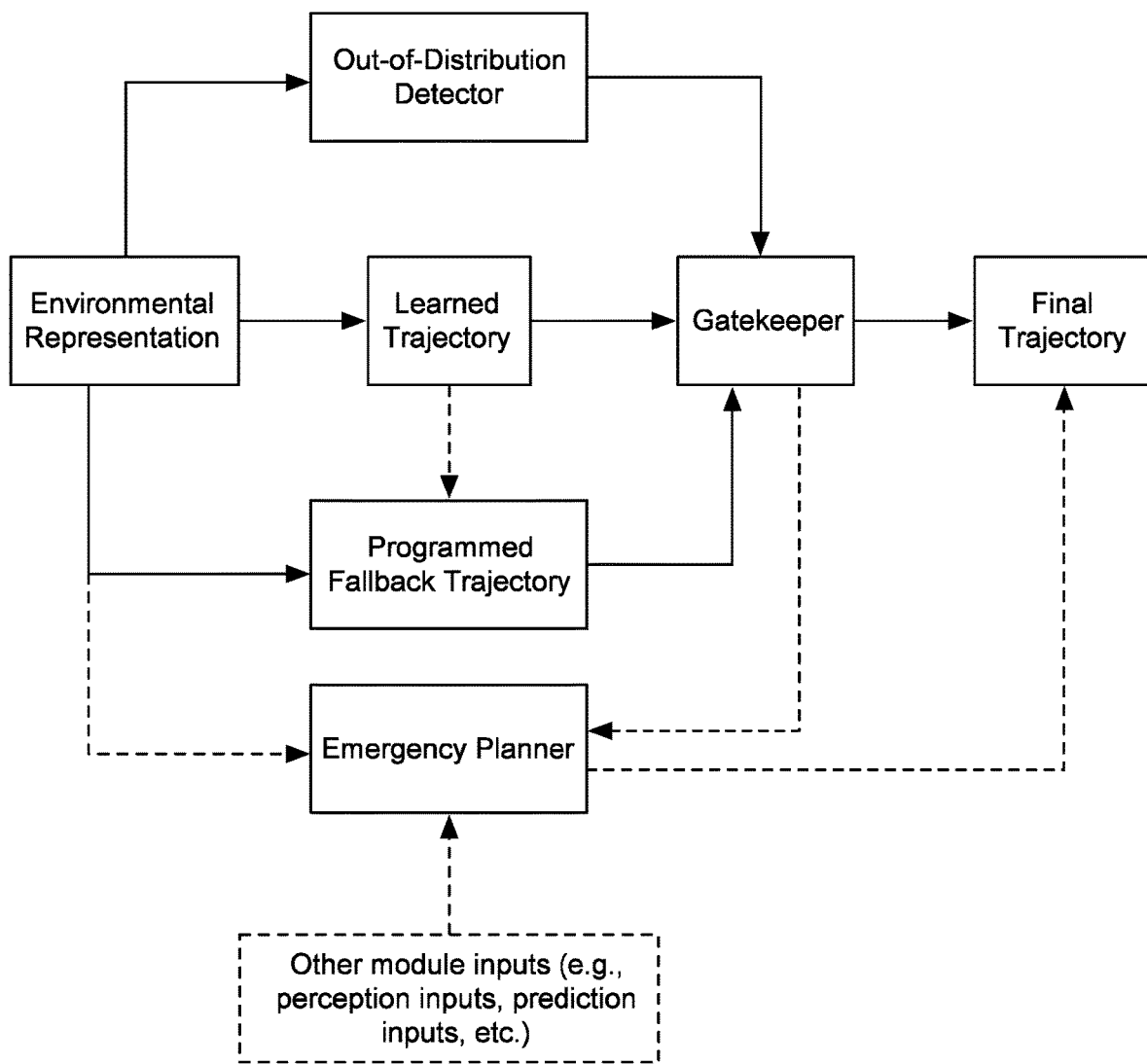
FIG. 16 depicts a variation of trajectory determination for the agent.

This is preferably performed with a gatekeeper (e.g., as shown in FIG. 3A, as shown in FIG. 16) of a validation layer, wherein the gatekeeper is preferably in communication with the out-of-distribution detector, the computing system and/or learned model for determining a learned trajectory, and the fallback motion planner, but can additionally or alternatively be in communication with a control system of the agent and/or any other suitable components and/or modules.

The information passed to the gatekeeper preferably includes the output uncertainty values associated with the learned trajectory (e.g., epistemic and aleatoric uncertainties, aggregated uncertainties from multiple modules, total predictive variance, etc.) the probability from an out-of-distribution detector, and a fallback trajectory from the fallback motion planner, but can additionally or alternatively include any other information (e.g., set of inputs), a subset of uncertainty values or other information (e.g., no fallback trajectory initially), other uncertainty values, and/or any combination.

The gatekeeper preferably compares an out-of-distribution probability with an upper threshold, referred to herein as a threshold "T", wherein in an event that the out-of-distribution probability exceeds the upper threshold, the fallback trajectory is implemented (e.g., if the fallback trajectory subsequently satisfies a set of constraints). Additionally or alternatively, an in-distribution probability (confidence) can be compared with a lower thresholds, multiple thresholds can be implemented, and/or the gatekeeper can be otherwise operated.

In the event that the uncertainty value exceeds a threshold T at a learned model (e.g., $2^{nd}$ learning module, learned model for trajectory generation, etc.), indicating the learned model may not be reliable enough to trust its output, the gatekeeper preferably switches to a programmed (classical) fallback trajectory as determined by a fallback motion planner, which can execute a deterministic sequence of actions. The planner is preferably designed to output a safe and efficient path from the current state to the next goal state and can prescribed any or all of: lower speeds, lower acceleration, higher deceleration, and/or any other features that prioritize safety over progress.

Figure 4:
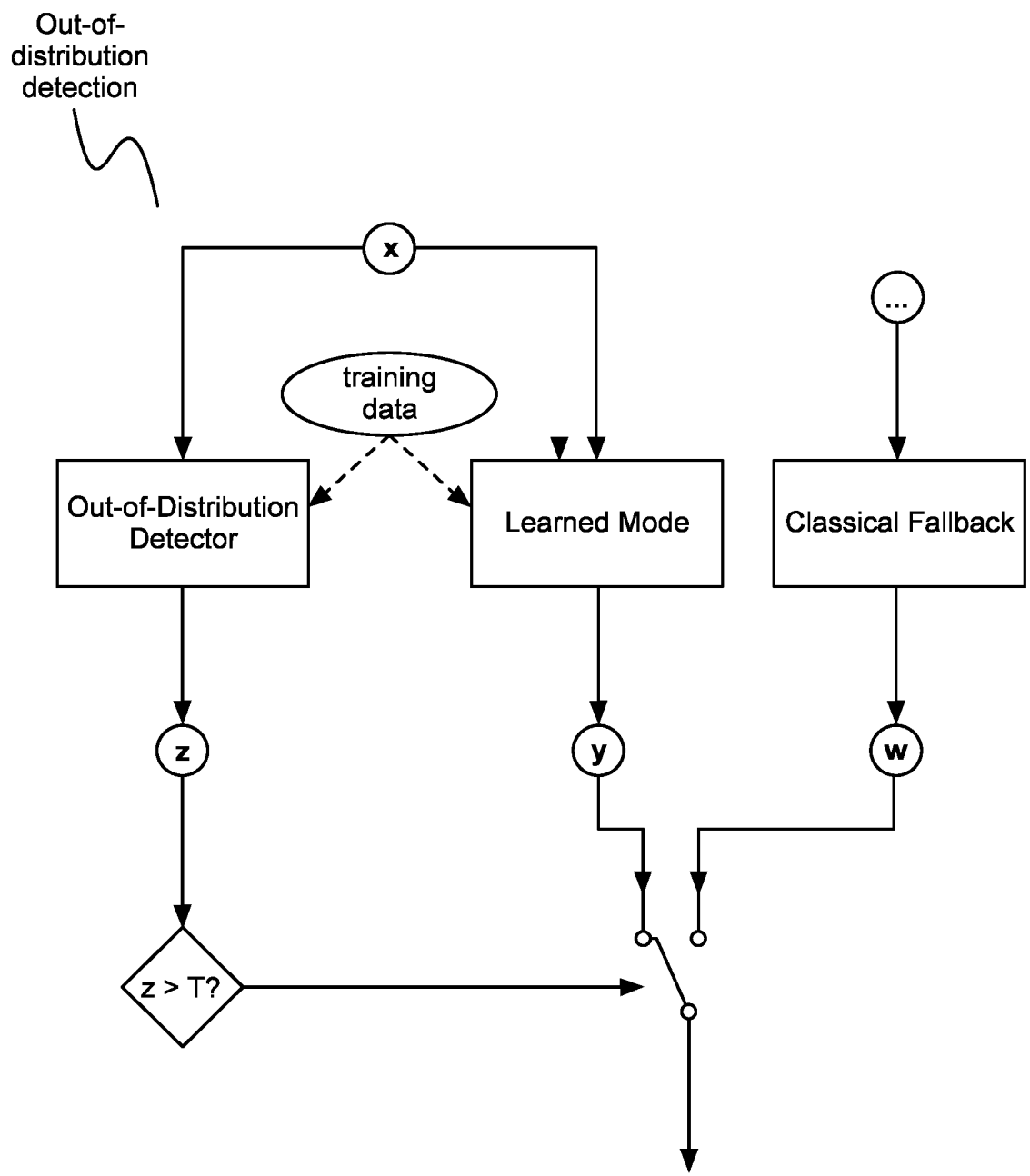
FIG. 4 depicts a schematic variation of an out-of-distribution detector, learned model, and classical fallback mechanism.

In a set of preferred variations, as shown in FIG. 4, for instance, an out-of-distribution probability value determined by a trajectory generation module's out-of-distribution detector and represented as z (having a value between 0 and 1) is sent to the gatekeeper, which compares the z value with a tuned threshold value T. If the value of z exceeds the value of T, the learned trajectory from the module is preferably ignored and a programmed fallback trajectory is followed. In the specific example of FIG. 4, the out-of-distribution detection is used to ignore a learned output, wherein x represents input data at a test time; y represents the learned model's output for z; w represents a classically programmed fallback response for the given situation; z represents the estimated probability P(out-of-distribution) [P(ODD)] that x is outside of the training distribution to learn y; and T represents a threshold such that if z>T, then w is implemented rather than y.

The value of T is preferably tuned to prevent either a too high or a too low value, as: if the threshold T is too high, then an actual edge case or unusual scenario may not produce a needed fallback, and if the value of T is too low, the fallback may be triggered even for a slight variance in usual scenarios.

In fixed route use cases of these variations, because there is strong prior information of the limited usual scenarios and their variance, a more conservative threshold value of T can be selected than for other use cases, where a fallback scenario is only triggered in unusual cases that have not been seen before on the specific route, which in itself will occur much more rarely. This can be in contrast to use cases with larger ODDs (e.g., using geo-fenced regions), such as robotic taxi use cases, where in-distribution examples will have very high variance, making it challenging to reliably identify an out-of-distribution case. In specific examples of this, if the T value is chosen conservatively, the fallback will be triggered very frequently, which can cause annoyance to the riders as well as making the progress to the destination extremely slow.

S230 can optionally include comparison with another threshold, wherein in an event that the uncertainty value exceeds a second threshold greater than the first (e.g., an upper-bound threshold, etc.), an indication is made that the input is extremely unusual and even an overly-cautious programmed motion planner is not reliable (e.g. data from all sensors is not received causing sensory-blindness). During such an incident, the system can default to a fail-safe recovery behavior as described below with the emergency planner.

In the specific example shown in FIGS. 10A-10C, for instance, any or all of the sensors providing information of the surrounding world fail, making the agent suddenly "blind". For a time, referred to as a second time, at which the incidence occurs, the world as seen by the vehicle in shown in FIG. 10B. FIG. 10A indicates a first time prior to the second time, and FIG. 10C indicates a third time later than the second time. In absence of an architecture as described above, a fail-safe conservative reaction could be to slam the brakes and come to an immediate stop. However, this can lead to a high chance of getting rear-ended. In preferred variations, at the occurrence of an incidence like above, the stack defaults to a Fail-Safe Layer that generates a Minimum Risk World Representation from a Perception module and a Prediction module of the agent, as shown in FIG. 10C. This provides the Planning module with minimal essential information indicating that the agent has enough time to turn on emergency blinkers and come to a stop at a safe deceleration rate. Meanwhile, as the Fail-safe operation is in progress to bring the vehicle to a stop, if the sensors come back-on, the stack can go back to its normal operation condition without creating a prolonged annoyance to other road users.

The gatekeeper further preferably compares any or all of the output uncertainty values with one or more thresholds, rules, and/or constraints, which can function to trigger an emergency planner in an event that neither trajectory is satisfactory. Additionally or alternatively, this can function to perform any or all of: determining if the output from a module is reliable; determining which module may be unreliable (e.g., such that its performance can be altered, such that its output can be altered, etc.); triggering a particular fallback scenario based on the module and/or value; and/or performing any other function(s).

In some variations, for instance, if the uncertainty (e.g., epistemic uncertainty, aleatoric uncertainty, total variance, etc.) at any stage falls outside of a threshold (e.g., exceeds a threshold), indicating that the learned model might not be reliable enough to trust its own output, an overly-cautious fallback motion planner can be called to execute a deterministic sequence of actions. For example, it may be suitable to use a total variance (e.g., fused epistemic and aleatoric uncertainties) (and/or other variance [e.g., epistemic uncertainty, aleatoric uncertainty, etc.]) threshold of +/−0.5 meters on object detection positions at a 50-meter range, as excess variance could limit the system's ability to properly (e.g., safely, without collision, etc.) navigate around the object.

In a specific example (e.g., as shown in FIGS. 9A-9C), a high uncertainty might originate due to low confidence in verifying a context (e.g. in a construction site), wherein a fast multi-lane highway context is reduced to a fast single lane context. Uncertainty from previous learning modules, such as a perception module, can be used to fallback to an overly-cautious classical motion planner, wherein the fallback planner is designed to output a safe and efficient path from the current state to the next goal state. Additionally or alternatively, an emergency planner can be called.

In a set of specific examples where the training set is large and high quality, except that it does not include night images, the network could in theory learn to still detect cars via headlights and give high quality estimates that it is sure of, such as 3.00 m+/−0.01 m, 3.01 m+/−0.02 m, 2.99 m+/−0.02 m, and others. Out-of-distribution detection could detect that even though the network is self-consistent and confident, the input data is very different and so perhaps a fallback (e.g., a programmed, deterministic trajectory) should be triggered out of caution. Even though the system was functioning, falling back could be a matter of principle as there is a mismatch between the ODD and the training data in this example.

S230 can optionally include calling an emergency planner (e.g., as described above), such as in an event that a validation process of a set of trajectories (e.g., learned trajectory, fallback trajectory, etc.) at the gatekeeper (e.g., based on output uncertainties, based on a probability of out-of-distribution value, based on both types, etc.) results in an empty set (no validated trajectories) and/or all candidate trajectories (e.g., learned trajectories, programmed trajectories, learned and programmed trajectories, etc.) are associated with uncertainties above a predetermined threshold.

The uncertainty parameters can be associated with any or all of: outputs of learned models and/or modules (e.g., perception outputs, context, action, trajectory, etc.); inputs and an out-of-distribution detector; and/or any combination.

In preferred variations, for instance, the emergency planner is triggered at one or both of: one or more output uncertainty values (e.g., total variance, aleatoric uncertainty, epistemic uncertainty, etc.) associated with one or both of learned and programmed trajectories exceeding a threshold (and/or their outputs otherwise failing to satisfy a set of constraints and/or rules) and a probability (out-of-distribution) as determined by an out-of-distribution detector exceeding an upper threshold (e.g., greater than T). Additionally or alternatively, the emergency planner can be otherwise triggered and/or always producing outputs (e.g., and only used when needed).

In specific examples, the set of thresholds includes a set of upper thresholds wherein a fallback planner/emergency planner is triggered if the uncertainty (e.g., probability of out-of-distribution, aleatoric uncertainty, epistemic uncertainty, total variance, etc.) exceeds the threshold(s), further preferably a set of multiple upper thresholds, wherein a fallback response is triggered for the lower upper threshold (e.g., T), such as a programmed fallback trajectory, and wherein a second response is triggered for the higher upper threshold, such as implementing a minimum risk world representation with the emergency planner. In additional or alternative variations, the second response is implemented in response to a programmed fallback trajectory having an uncertainty (e.g., epistemic uncertainty, aleatoric uncertainty, total variance, other uncertainty, etc.) above a predetermined threshold. Additionally or alternatively, thresholds can be otherwise implemented.

The emergency planner preferably determines a deterministic sequence of actions in accordance with a minimum risk world representation and with inputs from a perception and/or prediction module of the vehicle only, but can additionally or alternatively produce any other suitable outputs based on any suitable information (e.g., all module information prior to a module which exceeds an uncertainty).

In some variations, the simultaneous combination of multiple hard constraints at the gatekeeper could render the feasible trajectory set empty. For example, the ego may have to swerve or brake suddenly in a candidate trajectory (e.g., learned trajectory, fallback trajectory, etc.) to avoid a collision. In specific examples, an emergency planner is triggered to implement a trajectory, wherein the hard constraint hierarchy has collision-avoidance as a top priority (remains a hard constraint), while the secondary constraints are relaxed by changing the motion planning optimization problem to add large penalties for violating these kinds of safe driving losses.

In a specific example in which all the sensors providing information of the surrounding world fail, the ego-vehicle is suddenly "blind" at some time $t_i$. In this case the world as seen by the vehicle, at time $t<t_i$ and $t \geq t_i$ are as shown in FIG. 10(A). In such a situation, without an architecture like above, a fail-safe conservative reaction would be to just slam the brakes and come to an immediate stop. However, as can be seen in FIG. 10(B), this leads to a high chance of getting rear-ended. Instead, at the occurrence of an incident as described, the stack can default to the emergency planner that generates a Minimum Risk World Representation from a perception module and prediction module of the agent, as shown in FIG. 10(c). This provides the planning module with minimal essential information indicating that the ego-vehicle has enough time to turn on the emergency blinkers and come to a stop at a safe deceleration rate. Meanwhile, as the emergency planner operation is in progress to bring the vehicle to a stop, if the sensors come back on, the stack preferably goes back to its normal operation condition without creating a prolonged annoyance to other road users. Additionally or alternatively, this can be otherwise suitably performed.

S230 can optionally include altering the performance of one or more modules and/or the outputs produced by one or more modules in light of any or all of the uncertainty values. This can include, for instance, skipping processes and/or reordering processes (e.g., module processes, learned model performance, etc.). In specific examples, if a context selected for the agent is associated with a high uncertainty, the method can skip the determination of a trajectory with a set of learned models and instead use a programmed trajectory from a fallback motion planner and/or revert to a fail-safe layer. In other specific examples, the method can include selecting another action (e.g., a predetermined fallback action, a next-highest-confidence action produced by a deep decision network, an equally-high-confidence action as the proposed action as produced by a deep decision network, etc.) for the agent to take.

S230 can additionally or alternatively include altering the performance of one or more modules and/or models, such as changing the size of a bounding box (e.g., as described above).

S230 can further additionally or alternatively include adjusting the output of a module/model based on uncertainty and/or otherwise performing the method in any suitable way(s).

In a first variation, S230 includes: checking for validation of a set of candidate trajectories at a gatekeeper, the candidate trajectories including one or both of a learned trajectory produced by a learned model and a fallback trajectory produced by a classical motion planner; in an event that a probability (out-of-distribution) from an out-of-distribution detector is above a predetermined threshold (e.g., T), eliminating the learned trajectory from consideration; in an event that any or all of the output uncertainties associate with the learned trajectory are above a predetermined threshold, removing the learned trajectory from consideration; and in an event that any or all of a set of output uncertainties associated with outputs in the stack are above a second predetermined threshold (e.g., above the previous threshold), the probability is above an upper predetermined threshold, and/or that the candidate trajectory set is empty, triggering an emergency planner.

Additionally or alternatively, S230 can include checking uncertainties throughout the method 200 (e.g., at the calculation of every output) and/or at any other suitable times.

In a set of specific example, S230 includes, for the planning module involved in trajectory generation and optionally for other/each module(s) in the stack, an unsupervised out-of-distribution detector is employed to observe anomalies in that module's input space through the calculation an uncertainty parameter (e.g., probability[out-of-distribution]), and if the degree of anomaly is found to exceed a threshold, a fallback scenario can be triggered. The output uncertainties (e.g., including at least aleatoric and epistemic uncertainty) are further preferably compared with one or more thresholds and/or constraints to ensure that the selected trajectory (e.g., learned trajectory, fallback trajectory, etc.) can be trusted, and if not, can trigger an emergency planner.

In a specific example of the emergency planner, for instance, if this uncertainty exceeds an upper bound threshold, indicating that none of the systems, including a fallback layer, is reliable (e.g. data from all sensors is not received causing sensory-blindness as shown in FIGS. 10A-10C), the vehicle can default to a fail-safe recovery behavior (e.g., as discussed below). Utilization of uncertainty estimates for each of the sub-modules guarantees that the agent is able to perform with nominal safety even during residual risk cases (scenarios that are infeasible for the autonomy stack to handle).

Additionally S230 can include any other suitable processes and/or be otherwise performed.

4.5 Method—Optional Processes

The method can additionally include any other suitable processes, such as any or all of: operating the vehicle according to the chosen trajectory (e.g., learned trajectory, fallback trajectory, emergency planner trajectory, etc.), determining a set of control commands based on the trajectory, operating the vehicle based on the set of control commands, and/or any other suitable processes.

5. Variations

In a first variation of the system 100, the system includes a computing system which includes and/or implements at least a set of one or more learned models involved in determining a learned trajectory of the agent; an out-of-distribution detector; a gatekeeper; a fallback motion planner; and an emergency planner. Additionally or alternatively, the system can include and/or implement any or all of: other modules (e.g., planning, prediction, localization, etc.); a controller of the agent; a sensor system; and/or any other components and/or combination of components.

In specific examples, the computing system is onboard the agent. In additional or alternative examples, any or all of the computing system is remote from the agent.

Additionally or alternatively, the system 100 can include any other suitable components and/or combination of components.

In a first variation of the method 200, the method includes: receiving a set of inputs, wherein the set of inputs includes sensor information from a sensor system of the autonomous agent, a labeled map indicating a set of contexts assigned to a route (e.g., fixed route) and/or a potential route of the agent, wherein a context of the agent is determined based on the map and the sensor information, and wherein an environmental representation is determined based on the set of inputs and received at a set of learned models, an out-of-distribution detector, and a fallback motion planner; optionally determining an action and associated output uncertainties (e.g., aleatoric and epistemic) with a $1^{st}$ learned model; determining a learned trajectory and associated output uncertainties (e.g., aleatoric and epistemic) a with a $2^{nd}$ learned model; determining a fallback trajectory with a fallback motion planner (e.g., wherein the learned trajectory and the fallback trajectory are passed through a gatekeeper); optionally determining a recovery behavior and/or recovery trajectory with an emergency planner (e.g., in an event that neither of the learned and fallback trajectories are deemed acceptable, to have as backup, etc.); determining a probability that input data is out-of-distribution with an out-of-distribution detector; determining a set of uncertainty values associated with a learned trajectory produced with one or more learned models (e.g., $2^{nd}$ learned model, $2^{nd}$ learned model and $1^{st}$ learned model, etc.); optionally aggregating any or all of the uncertainty parameters; checking for validation of a set of candidate trajectories at a gatekeeper, the candidate trajectories including one or both of a learned trajectory produced by a learned model and a fallback trajectory produced by a classical motion planner; in an event that a probability(out-of-distribution) from an out-of-distribution detector is above a predetermined threshold (e.g., T), eliminating the learned trajectory from consideration; in an event that any or all of the output uncertainties associate with the learned trajectory are above a predetermined threshold, removing the learned trajectory from consideration; and in an event that any or all of a set of output uncertainties associated with outputs in the stack are above a second predetermined threshold (e.g., above the previous threshold), the probability is above an upper predetermined threshold, and/or that the candidate trajectory set is empty, triggering an emergency planner.

In specific examples, an out-of-distribution detector as shown in FIG. 3 is implemented, which represents an architecture including data-driven, modular decision-making and trajectory generation modules along with an uncertainty estimation (out-of-distribution detection) for trajectory selection. The out-of-distribution detector preferably takes the same input as the learned trajectory generator and outputs a classification probability, z, for whether that input data matches the training data used to train the learned model based on the calculation of a set of uncertainty values. This classification probability distribution [0,1], is used as an estimation of uncertainty in the learned model's output. If the estimated probability, z, that an input, x, is not from the training distribution exceeds some threshold, T, then the classical fallback methods can be chosen to be relied upon. The possibly incorrect output, y, that the learned model produced with high uncertainty for the input x is ignored.

In specific examples, additional or alternative to those described above, S215 includes optionally receiving and/or determining a context based on a map; optionally selecting a single $1^{st}$ learned model from a $1^{st}$ set of multiple learned models (e.g., based on a 1:1 mapping from context to a $1^{st}$ learned model); optionally determining an action for the vehicle with the $1^{st}$ learned model; optionally selecting a $2^{nd}$ learned model from a $2^{nd}$ set of multiple learned models; determining a learned trajectory with the $2^{nd}$ learned model; determining a programmed fallback trajectory with a classical motion planner; and optionally determining a recovery behavior and/or trajectory for the agent.

Additionally or alternatively, the method can include any other suitable process(es) and/or combination of processes performed in any suitable order.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:

1. A system for autonomous vehicle trajectory determination, comprising:
    a model-based trajectory planner comprising a trained neural network model associated with a set of model inputs;
    a second trajectory planner which is deterministically programed;

a gatekeeper system communicatively connected to the model-based trajectory planner and the second trajectory planner, the gatekeeper system configured to:
  receive trajectory inputs from the model-based trajectory planner and the second trajectory planner; and
  provide a vehicle trajectory of the trajectory inputs based on a set of uncertainty evaluations, the set of uncertainty evaluations comprising:
    a first comparison of a first uncertainty threshold and a first uncertainty associated with the set of model inputs; and
    a second comparison of a second uncertainty threshold and a second uncertainty associated with an output of the model-based trajectory planner, wherein at least one of the first and second uncertainties is determined with a set of learned models; and
  a vehicle controller coupled to the gatekeeper system.

2. The system of claim 1, wherein the first uncertainty is received from an out-of-distribution detector which is communicatively coupled to the gatekeeper system.

3. The system of claim 2, wherein the out-of-distribution detector comprises a generative adversarial network.

4. The system of claim 1, wherein the second uncertainty threshold is received from the model-based trajectory planner.

5. The system of claim 1, wherein the first uncertainty is at least one of an aleatoric uncertainty and an epistemic uncertainty.

6. The system of claim 1, wherein the second uncertainty is a joint uncertainty estimate based on the first uncertainty.

7. The system of claim 1, wherein the second uncertainty comprises an aggregate uncertainty.

8. The system of claim 1, wherein the model-based trajectory planner comprises a plurality of context-specific, learned models trained for a fixed route.

9. The system of claim 1, wherein the trajectory input from the second trajectory planner is associated with a predetermined fallback action.

10. A system for determination of a vehicle trajectory, comprising a processing system configured to:
  receive a set of candidate trajectories, the set of candidate trajectories comprising a first trajectory and a second trajectory, wherein the first trajectory is received from a model-based trajectory planner comprising a trained neural network model:
  receive a set of uncertainties associated with the set of candidate trajectories, wherein the set of uncertainties comprises:
    a first uncertainty associated with the first trajectory; and
    a second uncertainty associated with a set of inputs, wherein the set of inputs is used to determine at least one of the first and second trajectories;
  evaluate the set of uncertainties; and
  output the vehicle trajectory from the set of candidate trajectories based on the evaluation and a set of rules.

11. The system of claim 10, wherein the processing system selectively communicatively couples an output of a motion planner to an input of a vehicle controller.

12. The system of claim 10, wherein the first and second trajectories are determined with deep-learning and classical techniques, respectively.

13. The system of claim 10, wherein the first uncertainty is received from an out-of-distribution detector which is communicatively coupled to the processing system.

14. The system of claim 10, wherein an output of the processing system is communicatively coupled to a vehicle controller which is configured to operate based on the vehicle trajectory.

15. The system of claim 10, wherein the processing system is deterministically programed.

16. The system of claim 10, wherein the first uncertainty is at least one of an aleatoric uncertainty and an epistemic uncertainty.

17. The system of claim 10, wherein the second uncertainty is a joint uncertainty estimate based on the first uncertainty.

18. The system of claim 10, wherein the vehicle trajectory is output based on satisfaction of a collision avoidance constraint.

19. A system for determination of a vehicle trajectory, comprising a processing system which is deterministically programmed and configured to:
  receive a set of candidate trajectories, the set of candidate trajectories comprising a first trajectory and a second trajectory;
  receive a set of uncertainties associated with the set of candidate trajectories, wherein the set of uncertainties comprises:
    a first uncertainty associated with the first trajectory; and
    a second uncertainty associated with a set of inputs, wherein the set of inputs is used to determine at least one of the first and second trajectories;
  evaluate the set of uncertainties; and
  output the vehicle trajectory from the set of candidate trajectories based on the evaluation and a set of rules.

* * * * *

UNITED STATES PATENT AND TRADEMARK OFFICE
CERTIFICATE OF CORRECTION

PATENT NO. : 11,586,214 B2
APPLICATION NO. : 17/704301
DATED : February 21, 2023
INVENTOR(S) : Gautam Narang et al.

It is certified that error appears in the above-identified patent and that said Letters Patent is hereby corrected as shown below:

In the Claims

Column 35, Line 47 (Approx.), In Claim 10, delete "model:" and insert --model;-- therefor Signed and Sealed this
Eighteenth Day of April, 2023

Katherine Kelly Vidal
*Director of the United States Patent and Trademark Office*